(12) United States Patent
Zhao et al.

(10) Patent No.: US 12,485,797 B2
(45) Date of Patent: Dec. 2, 2025

(54) POWER BATTERY VOLTAGE REGULATION CIRCUIT AND SYSTEM, AND CONTROL METHOD AND CONTROL APPARATUS THEREFOR

(71) Applicant: CONTEMPORARY AMPEREX TECHNOLOGY (HONG KONG) LIMITED, Hong Kong (CN)

(72) Inventors: Yuanmiao Zhao, Ningde (CN); Xiaojian Huang, Ningde (CN); Zhanliang Li, Ningde (CN); Yu Yan, Ningde (CN); Xinwei Chen, Ningde (CN); Zhimin Dan, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 48 days.

(21) Appl. No.: 18/596,661

(22) Filed: Mar. 6, 2024

(65) Prior Publication Data

US 2024/0208362 A1   Jun. 27, 2024

Related U.S. Application Data

(63) Continuation of application No. PCT/CN2022/087185, filed on Apr. 15, 2022.

(30) Foreign Application Priority Data

Mar. 9, 2022   (WO) ................ PCT/CN2022/079939

(51) Int. Cl.
*B60L 53/14*    (2019.01)
*B60L 53/22*    (2019.01)
(Continued)

(52) U.S. Cl.
CPC ............ *B60L 58/18* (2019.02); *B60L 53/14* (2019.02); *B60L 53/22* (2019.02); *B60L 53/24* (2019.02);
(Continued)

(58) Field of Classification Search
CPC .......... B60L 50/51; B60L 50/60; B60L 53/10; B60L 53/11; B60L 53/14; B60L 53/20;
(Continued)

(56) References Cited

U.S. PATENT DOCUMENTS

2009/0128158 A1   5/2009  Kawai
2010/0315043 A1*  12/2010 Chau ...................... B60L 58/10
                                                   320/134
(Continued)

FOREIGN PATENT DOCUMENTS

CN    209650081 U    11/2019
CN    111347924 A    6/2020
(Continued)

OTHER PUBLICATIONS

Decision to Grant a Patent received in the corresponding Japanese Application 2023-553729, mailed on Oct. 15, 2024.
(Continued)

*Primary Examiner* — Levi Gannon
(74) *Attorney, Agent, or Firm* — K&L Gates LLP

(57) ABSTRACT

Provided are a power battery voltage regulation circuit and system, and a control method and a control apparatus therefor. The power battery voltage regulation circuit includes a power module, a heating module, a charge/discharge interface, and a voltage regulation switch assembly, wherein the heating module comprises an energy storage element and a switch module; the power module comprises at least a first power battery and a second power battery; the power module is connected in parallel with the
(Continued)

switch module; and an external charge/discharge device is connected in parallel with the power module through the charge/discharge interface; the voltage regulation switch assembly comprises a plurality of switches that are provided between the charge/discharge interface and the power module; and the voltage regulation switch assembly and the switch module are used for regulating, in response to a control signal, a charge/discharge voltage between the external charge/discharge device and the power module.

20 Claims, 8 Drawing Sheets

(51) Int. Cl.
B60L 53/24 (2019.01)
B60L 58/18 (2019.01)
H02J 7/00 (2006.01)
H02J 7/04 (2006.01)

(52) U.S. Cl.
CPC .......... H02J 7/0013 (2013.01); H02J 7/0047 (2013.01); H02J 7/0068 (2013.01); H02J 7/0069 (2020.01); H02J 7/007182 (2020.01); H02J 7/04 (2013.01); B60L 2240/547 (2013.01); H02J 2207/20 (2020.01)

(58) Field of Classification Search
CPC .......... B60L 53/22; B60L 53/24; B60L 58/10; B60L 58/12; B60L 58/18; B60L 58/19; B60L 2240/547; H01M 10/44; H01M 10/46; H02J 7/0013; H02J 7/0047; H02J 7/0068; H02J 7/0069; H02J 7/007; H02J 7/00714; H02J 7/007182; H02J 7/04; H02J 2207/20

See application file for complete search history.

(56) References Cited

U.S. PATENT DOCUMENTS

| | | | |
|---|---|---|---|
| 2011/0050174 A1* | 3/2011 | King | B60L 53/20 320/134 |
| 2011/0187184 A1* | 8/2011 | Ichikawa | B60L 55/00 307/10.1 |
| 2013/0234675 A1* | 9/2013 | King | B60L 53/24 320/163 |
| 2014/0145677 A1 | 5/2014 | King | |
| 2014/0203761 A1 | 7/2014 | Paparrizos et al. | |
| 2015/0137751 A1* | 5/2015 | King | B60L 50/51 320/109 |
| 2016/0339796 A1 | 11/2016 | Angrick et al. | |
| 2018/0105060 A1 | 4/2018 | Mcquillen et al. | |
| 2019/0149065 A1* | 5/2019 | Tarkiainen | H02J 7/00 318/504 |
| 2019/0225095 A1* | 7/2019 | Hiroe | B60L 58/15 |
| 2019/0359072 A1* | 11/2019 | Takeda | B60L 1/00 |
| 2020/0185953 A1* | 6/2020 | Shimizu | B60L 53/11 |
| 2021/0146792 A1 | 5/2021 | Lehn et al. | |
| 2022/0231537 A1* | 7/2022 | Hirota | H02J 7/16 |
| 2022/0314824 A1* | 10/2022 | Guo | B60L 53/14 |
| 2023/0311706 A1* | 10/2023 | Takao | H02J 7/0048 307/10.1 |
| 2024/0113531 A1* | 4/2024 | Yamada | H02P 27/06 |

FOREIGN PATENT DOCUMENTS

| | | |
|---|---|---|
| CN | 111347925 A | 6/2020 |
| CN | 111355433 A | 6/2020 |
| CN | 210760284 U | 6/2020 |
| CN | 111660875 A | 9/2020 |
| CN | 112910037 A | 6/2021 |
| CN | 112937332 A | 6/2021 |
| CN | 11407456 A | 2/2022 |
| CN | 114074561 A | 2/2022 |
| GB | 2592243 A | 8/2021 |
| KR | 20190029870 A | 3/2019 |
| WO | 9301650 A1 | 1/1993 |

OTHER PUBLICATIONS

International Search Report received in the corresponding International Application PCT/CN2022/079939, mailed Sep. 26, 2022.
International Search Report received in the corresponding International Application PCT/CN2022/087185, mailed Nov. 23, 2022.
Notice of Allowance received in the corresponding U.S. Appl. No. 18/229,681, mailed Oct. 18, 2023.
Request for the Submission of an Opinion received in the corresponding Korean application 10-2023-7029696, mailed Jan. 17, 2024.
Notice of Allowance received in the corresponding Korean Application 10-2023-7029696, mailed on Jul. 18, 2024.
The extended European search report received in the counterpart European Application 22930420.9, mailed on Jan. 3, 2025.
The extended European search report received in the corresponding European Application 22921018.2, mailed on Mar. 27, 2024.
Notice of Reasons for Refusal received in the corresponding Japanese Application 2023-553729, mailed on May 7, 2024.
First Office Action (with English Machine Translation), mailed Jun. 13, 2025, for corresponding Chinese Patent Application Serial No. 202280004699.1.
2nd Office Action (with English Machine Translation), mailed Sep. 3, 2025, for corresponding Chinese Patent Application Serial No. 202280004699.1.

* cited by examiner

POWER BATTERY VOLTAGE REGULATION CIRCUIT AND SYSTEM, AND CONTROL METHOD AND CONTROL APPARATUS THEREFOR

CROSS-REFERENCE TO RELATED APPLICATIONS

This application is a continuation of International Application PCT/CN2022/087185, filed on Apr. 15, 2022, which claims priority to International Application PCT/CN2022/079939, filed on Mar. 9, 2022 and entitled "POWER BATTERY VOLTAGE REGULATION CIRCUIT AND SYSTEM, AND CONTROL METHOD AND CONTROL APPARATUS THEREFOR", which is incorporated herein by reference in its entirety.

TECHNICAL FIELD

The present application relates to the field of battery technologies, and in particular to a power battery voltage regulation circuit and system, and a control method and a control apparatus therefor.

BACKGROUND ART

Due to the advantages of high energy density, recyclable charging, safety and eco-friendliness, power modules are widely applied in fields such as new energy vehicles, consumer electronics, and energy storage systems. With the development of battery technologies, the various performances of power modules are improving, especially the voltage of power modules generally have been increased substantially.

However, the maximum output voltage of the currently used charging devices is still lower than the charge voltage required by new power modules with higher voltages, and it is also difficult for power modules to adjust the output voltage according to the needs of different load devices. Therefore, how to flexibly adjust the charge/discharge voltages of power modules in different scenarios is an urgent problem to be solved.

SUMMARY OF THE INVENTION

Embodiments of the present application provide a power battery voltage regulation system and a control method and control apparatus therefor, which can flexibly adjust the charge/discharge voltage of a power module to meet the requirement for the charge voltage or discharge voltage of the power module under different scenarios.

In the first aspect, the present application provides a power battery voltage regulation circuit including a power module, a heating module, a charge/discharge interface, and a voltage regulation switch assembly, wherein the heating module comprises an energy storage element and a switch module; the power module comprises at least a first power battery and a second power battery; the power module is connected in parallel with the switch module; and an external charge/discharge device is connected in parallel with the power module through the charge/discharge interface; the voltage regulation switch assembly comprises a plurality of switches that are provided between the charge/discharge interface and the power module; and the voltage regulation switch assembly and the switch module are used for regulating, in response to a voltage regulation control signal, a charge/discharge voltage between the external charge/discharge device and the power module.

The power battery voltage regulation circuit provided in embodiments of the present application, by controlling the voltage regulation switch assembly and the switch module, realizes the switching among different charge/discharge loops, and then realizes flexible and efficient regulation of the charge/discharge voltage between the external charge/discharge device and the power module under different charge/discharge requirements under the voltage regulation control signal, for example: forming loops for buck charging, boost charging, boost discharging, and buck discharging separately in the same circuit structure, so as to meet the charge voltage or discharge voltage requirements of the power module under different scenarios.

In some embodiments, the voltage regulation switch assembly includes a first switch, a second switch, a third switch, a fourth switch, and a fifth switch, wherein the first switch and the third switch are provided on a positive electrode side and a negative electrode side of the charge/discharge interface, respectively; the second switch is provided between a positive electrode side of the first power battery and a first end of the switch module; the fifth switch is provided between a negative electrode side of the first power battery and a second end of the switch module; and the fourth switch is provided between the negative electrode side of the first power battery and a positive electrode side of the second power battery.

The power battery voltage regulation circuit provided in embodiments of the present application fully considers the requirement for voltage regulation when charging and discharging the power module under different circumstances, and provides switches at different locations in the charge/discharge loop of the power module for the purpose of switching between different charge/discharge loops. In addition, it can form loops for buck charging, boost charging, boost discharging, and buck discharging separately in the same circuit structure by controlling the on and off of different switches in the voltage regulation switch assembly and the switch module, so that the charge/discharge voltage of the power module can be flexibly adjusted without replacing the circuit structure so as to meet the requirement of the charge voltage or discharge voltage of the power module under different scenarios.

In some embodiments, the switch module includes a charge/discharge switching module and a bridge arm group connected in parallel, one end of the first switch being connected to the positive electrode side of the charge/discharge interface and the other end of the first switch being connected to a first end of the charge/discharge switching module; one end of the third switch being connected to the negative electrode side of the charge/discharge interface and the other end of the third switch being connected to a second end of the charge/discharge switching module; one end of the second switch being connected to the positive electrode side of the first power battery and the other end of the second switch being connected to all upper bridge arms of the bridge arm group in a common line; and one end of the fifth switch being connected to the negative electrode side of the first power battery, and the other end of the fifth switch, all lower bridge arms of the bridge arm group, and the second end of the charge/discharge switching module are connected in a common line, wherein the positive electrode side of the second power battery is further connected to the first end of the charge/discharge switching module.

In embodiments provided in the present application, switches are provided at different locations in the charge/ discharge loops of the power module for the purpose of switching between different charge/discharge loops, thus making it possible to flexibly adjust the output voltage according to the requirements of the load device without changing the circuit structure, while using the circuit structure of the power battery voltage regulation system itself to provide energy to the motor, thus enabling boost and buck charging and discharging of the power module through the on and off of different switches in the same circuit.

In some embodiments, the switch module includes a charge/discharge switching module and a bridge arm group connected in parallel, a first end of the energy storage element being connected to the bridge arm group and a second end of the energy storage element being connected to the charge/discharge switching module.

The power battery voltage regulation circuit provided in embodiments of the present application ensures the boost or buck of the charge/discharge voltage between the external charge/discharge device and the power module by storing and providing energy during the charge/discharge process through the charge/discharge switching module and the bridge arm group under different charge/discharge requirements.

In some embodiments, the energy storage element includes an M-phase motor; the bridge arm group comprises M phases of bridge arms, M being a positive integer; M phases of windings of the M-phase motor are connected to upper and lower bridge arm connection points of phases of bridge arm of the M phases of bridge arms on a one-to-one corresponding basis, respectively; and the charge/discharge switching module includes a first switching circuit and a second switching circuit connected in series, a connection point of the first switching circuit with the second switching circuit being connected to a neutral point of the M-phase motor.

The power battery voltage regulation circuit provided in embodiments of the present application ensures the boost or buck of the charge/discharge voltage between the external charge/discharge device and the power module by storing and providing energy during the charge/discharge process through the charge/discharge switching module and the bridge arm group under different charge/discharge requirements. The charge/discharge switching module further ensures free switching of charge/discharge between the battery and the motor, the motor and the external device, and the battery and the external device.

In some embodiments, the first switching circuit and the second switching circuit each include a triode and a flyback diode connected in parallel.

The power battery voltage regulation circuit provided in embodiments of the present application improves the efficiency of the charge/discharge switching module for free switching of charge/discharge between the battery and the motor, the motor and the external device, and the battery and the external device through the triode and the flyback diode connected in parallel.

In some embodiments, the first switching circuit and the second switching circuit each include a triode or a relay switch.

The power battery voltage regulation circuit provided in embodiments of the present application improves the efficiency of the charge/discharge switching module for free switching of charge/discharge between the battery and the motor, the motor and the external device, and the battery and the external device through the triode or the relay switch.

In some embodiments, the first switching circuit comprises a diode and the second switching circuit comprises a switch; or the first switching circuit comprises a switch and the second switching circuit comprises a diode.

The power battery voltage regulation circuit provided in embodiments of the present application improves the efficiency of the charge/discharge switching module for free switching of charge/discharge between the battery and the motor, the motor and the external device, and the battery and the external device through the free combination of diodes and switches in parallel.

In some embodiments, the power module is connected with a first voltage stabilizing capacitor in parallel at the two ends and the charge/discharge interface is connected with a second voltage stabilizing capacitor in parallel at the two ends.

The power battery voltage regulation circuit provided in embodiments of the present application ensures the stability and continuity of the voltage at two ends of the power module or of the charge/discharge interface during charging/discharging through the first voltage stabilizing capacitor and the second voltage stabilizing capacitor.

In some embodiments, currents flowing through all the windings of the M-phase motor are of equal magnitude and in the same phase.

In some embodiments, the motor is a three-phase motor.

In the power battery voltage regulation circuit provided in embodiments of the present application, currents in all the windings of the motor are of equal magnitude and in the same phase, thus ensuring the synchronization and flexibility of the control of bridge arm switches in the bridge arm group.

In the second aspect, the present application provides an electrical device including a control module as well as any of the power battery voltage regulation circuits of the first aspect described above, wherein the control module is connected to the switch module and the voltage regulation switch assembly and is used for controlling the voltage regulation switch assembly and the switch module to regulate the charge/discharge voltage between the external charge/discharge device and the power module.

The electrical device provided in embodiments of the present application, through the control module and the power battery voltage regulation circuit, realizes the switching among different charge/discharge loops, and then realizes flexible and efficient regulation of the charge/discharge voltage between the external charge/discharge device and the power module under different charge/discharge requirements under the voltage regulation control signal, for example: forming loops for buck charging, boost charging, boost discharging, and buck discharging separately in the same circuit structure, so as to meet the charge voltage or discharge voltage requirements of the power module under different scenarios.

In the third aspect, the present application provides a power battery voltage regulation system including an external charge/discharge device and the electrical device in the second aspect described above, the external charge/discharge device being connected to the charge/discharge interface in the electrical device.

The power battery voltage regulation system provided in embodiments of the present application, through the external charge/discharge device and the electrical device, realizes the switching among different charge/discharge loops, and then realizes flexible and efficient regulation of the charge/discharge voltage between the external charge/discharge device and the power module under different charge/discharge requirements under the voltage regulation control signal, for example: forming loops for buck charging, boost charging, boost discharging, and buck discharging separately in the same circuit structure, so as to meet the charge voltage or discharge voltage requirements of the power module under different scenarios.

In the fourth aspect, the present application provides a power battery voltage regulation method, which is applicable to the power battery voltage regulation system of the third aspect, including: in a charge/discharge process between an external charge/discharge device and an electrical device, acquiring a first voltage of a power module and acquiring a second voltage of the external charge/discharge device; and controlling, according to the first voltage and the second voltage, a voltage regulation switch assembly and a switch module to regulate a charge/discharge voltage between the external charge/discharge device and the power module.

The power battery voltage regulation method provided in embodiments of the present application, through the voltage regulation switch assembly and the switch module in the power battery voltage regulation system, realizes the switching among different charge/discharge loops, and then realizes flexible and efficient regulation of the charge/discharge voltage between the external charge/discharge device and the power module under different charge/discharge requirements under the voltage regulation control signal, for example: forming loops for buck charging, boost charging, boost discharging, and buck discharging separately in the same circuit structure, so as to meet the charge voltage or discharge voltage requirements of the power module under different scenarios.

In some embodiments, the first voltage is a battery voltage of the power module and the second voltage is an output voltage of the external charge/discharge device; and controlling, according to the first voltage and the second voltage, the voltage regulation switch assembly and the switch module to regulate a charge/discharge voltage between the external charge/discharge device and the power module specifically includes: controlling, when the battery voltage is less than the output voltage, the voltage regulation switch assembly and the switch module to buck the charge voltage of the external charge/discharge device for charging the power module; and controlling, when the battery voltage is greater than the output voltage, the voltage regulation switch assembly and the switch module to boost a charge voltage of the external charge/discharge device for charging the power module.

The power battery voltage regulation method provided in embodiments of the present application flexibly regulates the charge voltage of the power module according to the relationship between voltages of the charging device and the power module, while using the circuit structure of the power battery voltage regulation system itself to provide energy to the motor, thus enabling boost charging of the power module through the on and off of different switches in the same circuit. This enables the charging device to charge both a power module having a voltage lower than the maximum output voltage of the charging device and a power module having a higher voltage compared to the maximum output voltage of the charging device. The control method can flexibly adjust the charge voltage of the power module in different scenarios, which can solve the compatibility problem of external charge/discharge device and also make the charge process of the power module not limited by the maximum output voltage of the charging device.

In some embodiments, controlling, when the battery voltage is greater than the output voltage, the voltage regulation switch assembly and the switch module to boost a charge voltage of the external charge/discharge device for charging the power module specifically includes: controlling, in a first time period, the external charge/discharge device to charge the energy storage element; and controlling, in a second time period, the external charge/discharge device and the energy storage element together to charge the power battery.

With the power battery voltage regulation method provided in embodiments of the present application, it is possible, when the battery voltage is greater than the output voltage, to first control the external charge/discharge device to charge the energy storage element, and then control the external charge/discharge device and the energy storage element to charge the power battery together, without changing the circuit structure, thus realizing continuous boost charging.

In some embodiments, the switch module includes a charge/discharge switching module and a bridge arm group connected in parallel; and the voltage regulation switch assembly includes a first switch, a second switch, a third switch, a fourth switch, and a fifth switch; and controlling, when the battery voltage is greater than the output voltage, the voltage regulation switch assembly and the switch module to boost a charge voltage of the external charge/discharge device for charging the power module specifically includes: controlling, in a first time period, the first switch and the third switch to be on, a first switching circuit of the charge/discharge switching module and all lower bridge arms of the bridge arm group to be on, a second switching circuit of the charge/discharge switching module and all upper bridge arms of the bridge arm group to be off, and the second switch, the fourth switch, and the fifth switch to be off; and controlling, in a second time period, the first switch, the second switch, the third switch, and the fourth switch to be on, the first switching circuit of the charge/discharge switching module and all the upper bridge arms of the bridge arm group to be on, and the second switching circuit of the charge/discharge switching module, all the lower bridge arm of the bridge arm group, and the fifth switch to be off, wherein the control of the first time period and the control of the second time period are continuously performed alternatively.

In embodiments provided by the present application, it is possible to flexibly adjust the voltage that is output to the power module according to different voltages of the charging device without changing the circuit structure, while using the circuit structure of the power battery voltage regulation system itself to provide energy to the motor, thus enabling the boost of the charge voltage of the external charge/discharge device for charging the power module through the on and off of different switches in the same circuit, so that the charging device can charge the power module having a battery voltage higher than the maximum output voltage of the charging device.

During the charge process of the power module, the continuous charging after boosting is achieved through the alternating control of the first time period and the second time period, thereby ensuring the continuity of the charge process.

In some embodiments, controlling, when the battery voltage is less than the output voltage, the voltage regulation switch assembly and the switch module to buck the charge voltage of the external charge/discharge device for charging the power module specifically includes: controlling, in a first time period, the external charge/discharge device to charge the energy storage element; and controlling, in a second time period, the energy storage element to charge the power battery.

With the power battery voltage regulation method provided in embodiments of the present application, it is possible, when the battery voltage is less than the output voltage, to first control the external charge/discharge device to charge the energy storage element, and then control the energy storage element to charge the power battery, without changing the circuit structure, thus realizing continuous buck charging. In some embodiments, the switch module includes a charge/discharge switching module and a bridge arm group connected in parallel; and the voltage regulation switch assembly includes a first switch, a second switch, a third switch, a fourth switch, and a fifth switch; and controlling, when the battery voltage is less than the output voltage, the voltage regulation switch assembly and the switch module to buck the charge voltage of the external charge/discharge device for charging the power module specifically includes: controlling, in a first time period, the first switch and the third switch to be on, a first switching circuit of the charge/discharge switching module and all lower bridge arms of the bridge arm group to be on, a second switching circuit of the charge/discharge switching module and all upper bridge arms of the bridge arm group to be off, and the second switch, the fourth switch, and the fifth switch to be off; and controlling, in a second time period, the second switch and the fourth switch to be on, the fifth switch to be off, the second switching circuit of the charge/discharge switching module and all upper bridge arms of the bridge arm group to be on, the first switching circuit of the charge/discharge switching module, all lower bridge arms of the bridge arm group, the first switch, the third switch, and the fifth switch to be off, wherein the control of the first time period and the control of the second time period are continuously performed alternatively. With the power battery voltage regulation method provided in embodiments of the present application, it is possible to flexibly adjust the voltage that is output to the power module according to different voltages of the charging device without changing the circuit structure, while using the circuit structure of the power battery voltage regulation system itself to provide energy to the motor, thus enabling the buck of the charge voltage of the external charge/discharge device for charging the power module through the on and off of different switches in the same circuit, so that the charging device can charge the power module having a battery voltage lower than the maximum output voltage of the charging device.

In some embodiments, the first voltage is an output voltage of the power module and the second voltage is a requested voltage of the external charge/discharge device as a load; and controlling, according to the first voltage and the second voltage, the voltage regulation switch assembly and the switch module to regulate a charge/discharge voltage between the external charge/discharge device and the power module specifically includes: in a charge/discharge process between the external charge/discharge device and the electrical device, acquiring a battery voltage of the power module; acquiring a requested voltage of the external charge/discharge device serving as the load; and controlling, according to the battery voltage and the requested voltage, the voltage regulation switch assembly and the switch module to regulate a charge/discharge voltage between the external charge/discharge device and the power module.

The control method for the power battery voltage regulation system provided in embodiments of the present application can be adapted to various load devices having different required voltages under different circumstances by controlling the voltage regulation switch assembly and the switch module without changing the circuit structure, so that the power battery voltage regulation system can provide electrical energy to both a load device having a required voltage higher than the voltage of the power module and a load device having a required voltage lower than the voltage of the power module, thus realizing flexible adjustment of the discharge voltage of the power module under different scenarios so as to provide electrical energy to various load devices.

In some embodiments, controlling, according to the battery voltage and the requested voltage, the voltage regulation switch assembly and the switch module to regulate a charge/discharge voltage between the external charge/discharge device and the power module specifically includes: controlling, when the output voltage of the power module is greater than the requested voltage, the voltage regulation switch assembly and the switch module to buck the battery voltage of the power module; and controlling, when the output voltage of the power module is less than the requested voltage, the voltage regulation switch assembly and the switch module to boost the battery voltage of the power module.

Under different circumstances, by controlling the voltage regulation switch assembly and the switch module, the power battery voltage regulation system can provide electrical energy to both a load device having a required voltage higher than the voltage of the power module and a load device having a required voltage lower than the voltage of the power module, thus realizing flexible adjustment of the discharge voltage of the power module under different scenarios so as to provide electrical energy to various load devices.

In some embodiments, controlling, when the output voltage of the power module is less than the requested voltage, the voltage regulation switch assembly and the switch module to boost the battery voltage of the power module specifically includes: controlling, in a first time period, the power battery to charge the energy storage element; and controlling, in a second time period, the power battery and the energy storage element together to charge the external charge/discharge device.

With the power battery voltage regulation method provided in embodiments of the present application, when the output voltage of the power module is less than the requested voltage, it is possible to first control the power battery to charge the energy storage element, and then control the power battery and the energy storage element to charge the external charge/discharge device together, without changing the circuit structure, thus realizing continuous boost discharging.

In some embodiments, the switch module includes a charge/discharge switching module and a bridge arm group connected in parallel; and the voltage regulation switch assembly includes a first switch, a second switch, a third switch, a fourth switch, and a fifth switch; and controlling the voltage regulation switch assembly and the switch module to buck the battery voltage of the power module specifically includes: controlling, in a first time period, the second switch and the fourth switch to be on, the fifth switch to be off, a second switching circuit of the charge/discharge switching module and all upper bridge arms of the bridge arm group to be on, the first switching circuit of the charge/discharge switching module, all lower bridge arms of the bridge arm group, the first switch, the third switch, and the fifth switch to be off; and controlling, in a second time period, the first switch, the second switch, the third switch, and the fourth switch to be on, the first switching circuit of the charge/discharge switching module and all the upper bridge arms of the bridge arm group to be on, and the second switching circuit of the charge/discharge switching module, all the lower bridge arms of the bridge arm group, and the fifth switch to be off, wherein the control of the first time period and the control of the second time period are continuously performed alternatively.

In embodiments provided in the present application, it is possible to flexibly regulate the output voltage according to the requirement of the load device without changing the circuit structure, while using the circuit structure of the power battery voltage regulation system itself to provide energy for the motor, thus enabling buck discharging of the power module through the on and off of different switches in the same circuit, so that the power battery voltage regulation system can provide electrical energy for a load device having a required voltage lower than the voltage of the power module.

During the charge process of the power module, the continuous discharging after bucking is achieved through the alternating control of the first time period and the second time period, thereby ensuring the continuity of the discharge process.

In some embodiments, controlling, when the output voltage of the power module is greater than the requested voltage, the voltage regulation switch assembly and the switch module to buck the battery voltage of the power module specifically includes: controlling, in a first time period, the power battery to charge the energy storage element; and controlling, in a second time period, the energy storage element to charge the external charge/discharge device.

With the power battery voltage regulation method provided in embodiments of the present application, when the output voltage of the power module is greater than the requested voltage, it is possible to first control the power battery to charge the energy storage element, and then control the energy storage element to charge the external charge/discharge device, without changing the circuit structure, thus realizing continuous buck discharging.

In some embodiments, the switch module includes a charge/discharge switching module and a bridge arm group connected in parallel; and the voltage regulation switch assembly includes a first switch, a second switch, a third switch, a fourth switch, and a fifth switch; and controlling the voltage regulation switch assembly and the switch module to boost a battery voltage of the power module specifically includes: controlling, in a first time period, the second switch and the fourth switch to be on, the fifth switch to be off, a second switching circuit of the charge/discharge switching module and all upper bridge arms of the bridge arm group to be on, the first switching circuit of the charge/discharge switching module, all lower bridge arms of the bridge arm group, the first switch, the third switch, and the fifth switch to be off; and controlling, in a second time period, the first switch and the third switch, the first switching circuit of the charge/discharge switching module and all lower bridge arms of the bridge arm group to be on, the second switching circuit of the charge/discharge switching module and all upper bridge arms of the bridge arm group, and the third switch, the fourth switch, and the fifth switch to be off, wherein the control of the first time period and the control of the second time period are continuously performed alternatively.

In embodiments provided in the present application, it is possible to flexibly regulate the output voltage according to the requirement of the load device without changing the circuit structure, while using the circuit structure of the power battery voltage regulation system itself to provide energy for the motor, thus enabling boost discharging of the power module through the on and off of different switches in the same circuit, so that the power battery voltage regulation system can provide electrical energy for a load device having a required voltage higher than the voltage of the power module.

During the charge process of the power module, the continuous discharging after boosting is achieved through the alternating control of the first time period and the second time period, thereby ensuring the continuity of the discharge process.

In the fifth aspect, the present application provides a power module voltage regulation device, including: a memory for storing executable instructions; and a central processing unit for connecting to the memory to execute the executable instructions so as to complete any of the power battery voltage regulation methods of the fourth aspect.

The power module voltage regulation device provided in embodiments of the present application, through the voltage regulation switch assembly and the switch module in the power battery voltage regulation system, realizes the switching among different charge/discharge loops, and then realizes flexible and efficient regulation of the charge/discharge voltage between the external charge/discharge device and the power module under different charge/discharge requirements under the voltage regulation control signal, for example: forming loops for buck charging, boost charging, boost discharging, and buck discharging separately in the same circuit structure, so as to meet the charge voltage or discharge voltage requirements of the power module under different scenarios.

In the sixth aspect, the present application provides a computer-readable storage medium having a computer program stored thereon, wherein the computer program is executed by a central processing unit to implement any of the power battery voltage regulation methods of the fourth aspect.

The computer-readable storage medium provided in embodiments of the present application, through the voltage regulation switch assembly and the switch module in the power battery voltage regulation system, realizes the switching among different charge/discharge loops, and then realizes flexible and efficient regulation of the charge/discharge voltage between the external charge/discharge device and the power module under different charge/discharge requirements under the voltage regulation control signal, for example: forming loops for buck charging, boost charging, boost discharging, and buck discharging separately in the same circuit structure, so as to meet the charge voltage or discharge voltage requirements of the power module under different scenarios.

DESCRIPTION OF DRAWINGS

In order to illustrate the technical solutions of the examples of the present application more clearly, the following briefly introduces the drawings required in the examples of the present application. Obviously, the drawings described below are only some examples of the present application. For those of ordinary skill in the art, other drawings can also be obtained according to the drawings without any creative effort.

Figure 1:
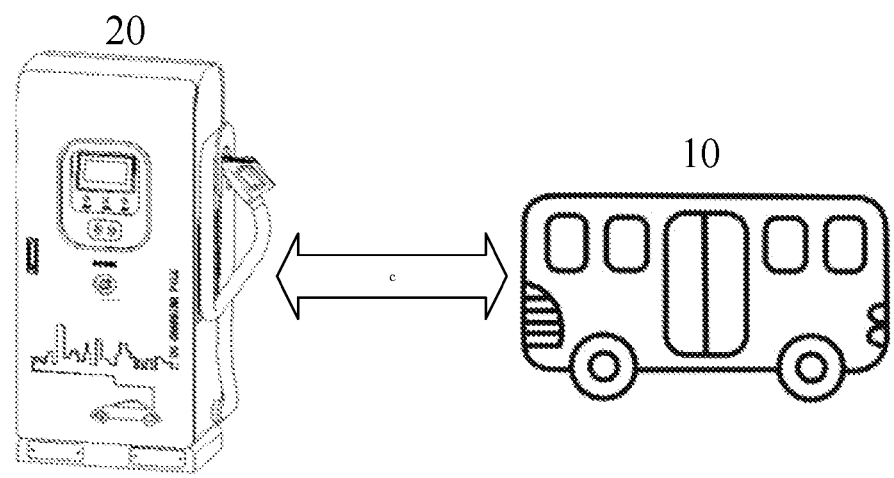
FIG. 1 is a schematic diagram of an application architecture of a charging method provided in an embodiment of the present application.

In the accompanying drawings, the accompanying drawings are not drawn to actual scale.

DETAILED DESCRIPTION

Embodiments of the present application will be described in further detail hereinafter in conjunction with the accompanying drawings and embodiments. The following detailed description of the embodiments and the drawings are used to illustrate the principles of the present application by way of example, but should not be used to limit the scope of the present application, that is, the present application is not limited to the described embodiments.

In the description of the present application, it should be noted that, unless otherwise stated, "plurality of" means two or more; the orientation or positional relationships indicated by the terms "upper", "lower", "left", "right", "inner" and "outer" are only for facilitating the description of the present application and simplifying the description, rather than indicating or implying that the apparatus or element referred to must have a particular orientation or be constructed and operated in a particular orientation, and therefore will not be interpreted as limiting the present application. In addition, the terms "first", "second" and "third" are only used for descriptive purposes, and cannot be construed as indicating or implying relative importance. "Vertical" does not mean being vertical in the strict sense, but within the allowable range of error. "Parallel" does not mean being parallel in the strict sense, but within the allowable range of error.

Orientation words appearing in the following description are all directions shown in the drawings, and do not limit the specific structure of the present application. In the description of the present application, it should also be noted that, unless otherwise expressly specified and defined, the terms "install", "connected" and "connect" should be understood in a broad sense, for example, they may be fixedly connected, detachably connected or integrally connected; and they may be directly connected or indirectly connected through an intermediate medium. For those of ordinary skill in the art, the specific meanings of the above terms in the present application may be understood according to specific circumstances.

With the development of battery technologies, the various performances of power modules are improving, especially the voltage of power modules generally have been increased substantially. For this new type of power module with a higher voltage, only a charging device that can output a correspondingly higher voltage can charge it. However, most of the charging devices currently in use can only charge conventional power modules with low voltages, and their maximum output voltages cannot reach the voltages required by the new power modules. If all the charging devices are replaced in order to adapt to the new power modules, it will lead to the waste of the existing charging devices and also increase unnecessary costs.

In addition, with the development of a wide variety of load devices (e.g., on-vehicle devices), the output voltages of the power module required by different load devices vary, so a method is needed to enable the power module to adjust the output voltage more flexibly during the discharge process to meet the needs of different load devices.

In view of this, embodiments of the present application provide a power battery voltage regulation system and a control method and control apparatus therefor. The power battery voltage regulation system includes a power module, a switch module, a charge/discharge interface, and a motor, and by controlling the on and off of different switches in the switch module, buck charging or boost charging can be realized in different scenarios, or boost discharging or buck discharging can be realized in different scenarios.

The power module in embodiments of the present application can be a lithium-ion battery, a lithium-metal battery, a lead-acid battery, a nickel-cadmium battery, a nickel-metal hydride battery, a lithium-sulfur battery, a lithium-air battery or sodium-ion battery, and the like, which is not limited herein. In terms of the scale, the battery in embodiments of the present application may be a battery cell, and may also be a battery module or a battery pack, which is not limited herein. In terms of the application scenario, the battery may be applied within power apparatuses such as automobiles and ships. For example, it can be applied within a power vehicle to supply power to the motor of the power vehicle, serving as the power source for the electric vehicle. The battery can also supply power to other electrical devices in the electric vehicle, such as powering the in-vehicle air conditioner, the on-vehicle player, and so on.

For the sake of description, the application of the power module to a new energy vehicle (power vehicle) will be used as an embodiment for illustration below.

The drive motor and its control system are one of the core components of the new energy vehicle, and its driving characteristics determine the main performance indices of the vehicle driving. The motor drive system of a new energy vehicle is mainly composed of an electric motor (i.e., a motor), a power converter, a motor controller (e.g., inverter), various detection sensors, and a power supply, and other parts. The motor is a rotating electromagnetic machine that operates by applying the principle of electromagnetic induction and is used to realize the conversion of electrical energy to mechanical energy. It absorbs electrical power from the electrical system and outputs mechanical power to the mechanical system during operation.

FIG. 1 is a schematic diagram of an application architecture that can be applied to the method of charging in embodiments of the present application. The application architecture includes a battery management system (BMS) 10 and a charging pile 20, wherein the BMS 10 can be connected to the charging pile 20 via a communication line to perform information interaction with the charging pile 20. For example, the communication line may be a controller area network (CAN) communication line or a daisy chain communication line.

Here, the BMS 10 is a BMS for a power module, and the power module is a battery that provides a power source to the electrical apparatus. Optionally, the power module may be a power storage battery. In terms of the type of battery, the power module may be a lithium-ion battery, a lithium-metal battery, a lead-acid battery, a nickel-cadmium battery, a nickel-metal hydride battery, a lithium-sulfur battery, a lithium-air battery, or a sodium-ion battery, and the like, which is not specifically limited in embodiments of the present application. In terms of the battery scale, the power module in embodiments of the present application may be a cell/battery cell, and may also be a battery module or a battery pack, which is not specifically limited in embodiments of the present application. Optionally, the electrical apparatus may be a vehicle, a ship or a spacecraft, and the like, which is not limited in embodiments of the present application. The BMS is a control system that protects the safety of the use of the power module and performs functions such as charge/discharge management, high-voltage control, battery protection, battery data collection, and battery status evaluation. The BMS may be integrated with the power module in the same device/apparatus, or the BMS may be provided outside the power module as an independent device/apparatus.

The charging pile 20, also known as a charger, is an apparatus for charging the power module. The charging pile can output charging power to charge the power module in accordance with the charging requirement of the BMS 10. For example, the charging pile 20 can output a voltage and a current in accordance with the required voltage and the required current sent by the BMS 10.

In order to meet the charge voltage requirements of the power module in different scenarios, the present application provides a power battery voltage regulation system.

Figure 2:
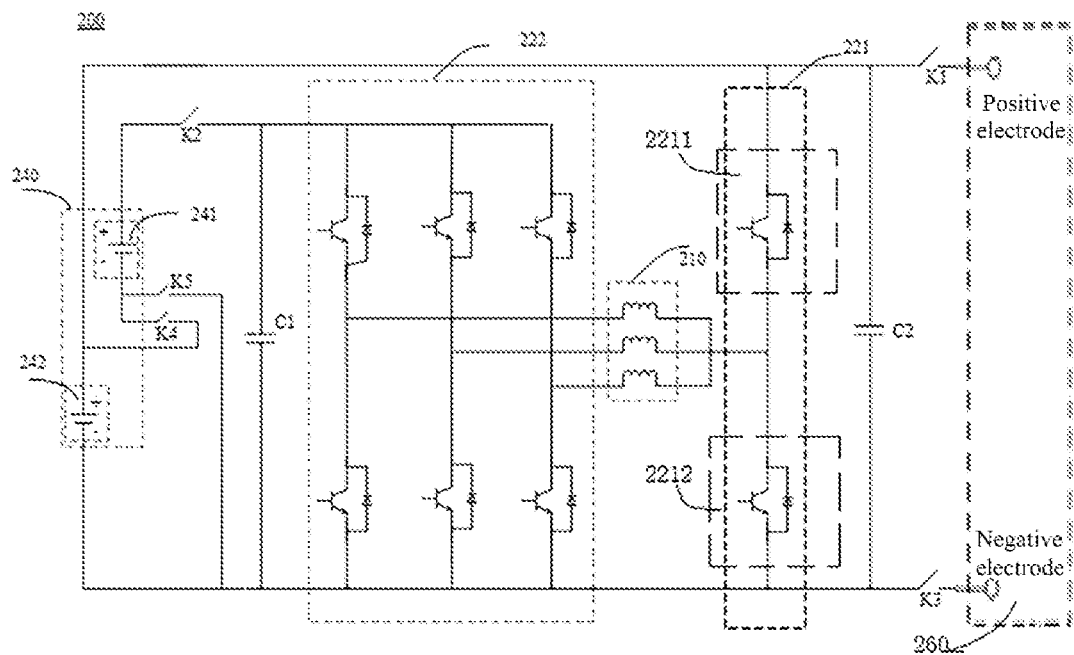
FIG. 2 is a schematic block diagram of a power battery voltage regulation circuit provided in an embodiment of the present application.

FIG. 2 is a schematic block diagram of a power battery voltage regulation circuit 200 provided in an embodiment of the present application.

As shown in FIG. 2, the present application provides a power battery voltage regulation circuit 200 including a power module 240, a heating module, a charge/discharge interface 260, and a voltage regulation switch assembly, wherein the heating module includes an energy storage element and a switch module; and the power module includes at least a first power battery 241 and a second power battery 242.

The power module 240 is connected in parallel with the switch module; and an external charge/discharge device is connected in parallel with the power module 240 through the charge/discharge interface 260.

The voltage regulation switch assembly includes a plurality of switches that are provided between the charge/discharge interface 260 and the power module 240; and the voltage regulation switch assembly and the switch module are used for regulating, in response to a voltage regulation control signal, a charge/discharge voltage between the external charge/discharge device and the power module 240.

The power battery voltage regulation circuit provided in embodiments of the present application, by controlling the voltage regulation switch assembly and the switch module, realizes the switching among different charge/discharge loops, and then realizes flexible and efficient regulation of the charge/discharge voltage between the external charge/discharge device and the power module 240 under different charge/discharge requirements under the voltage regulation control signal, for example: forming loops for buck charging, boost charging, boost discharging, and buck discharging separately in the same circuit structure, so as to meet the charge voltage or discharge voltage requirements of the power module 240 under different scenarios.

In specific implementation, the voltage regulation switch assembly includes a first switch K1, a second switch K2, a third switch K3, a fourth switch K4, and a fifth switch K5, wherein the first switch K1 and the third switch K3 are provided on a positive electrode side and a negative electrode side of the charge/discharge interface 260, respectively; the second switch K2 is provided between a positive electrode side of the first power battery 241 and a first end of the switch module; the fifth switch K5 is provided between a negative electrode side of the first power battery 241 and a second end of the switch module; and the fourth switch K4 is provided between the negative electrode side of the first power battery 241 and a positive electrode side of the second power battery 242.

On this basis, the power battery voltage regulation circuit provided in this implementation fully considers the requirement for voltage regulation when charging and discharging the power module 240 under different circumstances, and provides switches at different locations in the charge/discharge loop of the power module 240 for the purpose of switching between different charge/discharge loops.

Meanwhile, it can form loops for buck charging, boost charging, boost discharging, and buck discharging separately in the same circuit structure by controlling the on and off of different switches in the voltage regulation switch assembly and the switch module, so that the charge/discharge voltage of the power module 240 can be flexibly adjusted without replacing the circuit structure so as to meet the requirement of the charge voltage or discharge voltage of the power module 240 under different scenarios.

The implementation will be further elaborated in detail. As shown in FIG. 2, the switch module includes a charge/discharge switching module 221 and a bridge arm group 222 connected in parallel, one end of the first switch K1 being connected to the positive electrode side of the charge/discharge interface and the other end of the first switch K1 being connected to a first end of the charge/discharge switching module; one end of the third switch K3 being connected to the negative electrode side of the charge/discharge interface and the other end of the third switch K3 being connected to a second end of the charge/discharge switching module; one end of the second switch K2 being connected to the positive electrode side of the first power battery and the other end of the second switch K2 being connected to all upper bridge arms of the bridge arm group in a common line; and one end of the fifth switch K5 being connected to the negative electrode side of the first power battery, and the other end of the fifth switch K5, all lower bridge arms of the bridge arm group, and the second end of the charge/discharge switching module are connected in a common line, wherein the positive electrode side of the second power battery is further connected to the first end of the charge/discharge switching module.

On this basis, in this implementation, switches are provided at different locations in the charge/discharge loops of the power module 240 for the purpose of switching between different charge/discharge loops, thus making it possible to flexibly adjust the output voltage according to the requirements of the load device without changing the circuit structure, while using the circuit structure of the power battery voltage regulation system itself to provide energy to the motor 210, thus enabling boost and buck charging and discharging of the power module 240 through the on and off of different switches in the same circuit.

In some embodiments, the switch module includes a charge/discharge switching module 221 and a bridge arm group 222 connected in parallel, a first end of the energy storage element being connected to the bridge arm group 222 and a second end of the energy storage element being connected to the charge/discharge switching module 221.

On this basis, in this implementation, the power battery voltage regulation circuit ensures the boost or buck of the charge/discharge voltage between the external charge/discharge device and the power module 240 by storing and providing energy during the charge/discharge process through the charge/discharge switching module 221 and the bridge arm group 222 under different charge/discharge requirements.

Specifically, as shown in FIG. 2, the energy storage element includes the M-phase motor 210 and windings connected to the M-phase motor 210.

Further, the bridge arm group 222 includes M phases of bridge arms, M being a positive integer; M phases of windings of the M-phase motor 210 are connected to upper and lower bridge arm connection points of phases of bridge arm of the M phases of bridge arms on a one-to-one corresponding basis, respectively; and the charge/discharge switching module 221 includes a first switching circuit 2211 and a second switching circuit 2212 connected in series, a connection point of the first switching circuit 2211 with the second switching circuit 2212 being connected to a neutral point of the M-phase motor 210.

On this basis, in this implementation, the power battery voltage regulation circuit ensures the boost or buck of the charge/discharge voltage between the external charge/discharge device and the power module 240 by storing and providing energy during the charge/discharge process through the charge/discharge switching module 221 and the bridge arm group 222 under different charge/discharge requirements. The charge/discharge switching module 221 further ensures free switching of charge/discharge between the battery and the motor 210, the motor 210 and the external device, and the battery and the external device.

In some embodiments, as shown in FIG. 2, the first switching circuit 2211 and the second switching circuit 2212 each include a triode and a flyback diode connected in parallel.

The power battery voltage regulation circuit provided in embodiments of the present application improves the efficiency of the charge/discharge switching module 221 for free switching of charge/discharge between the battery and the motor 210, the motor 210 and the external device, and the battery and the external device by means of the triode and the flyback diode connected in parallel.

In other implementations, the first switching circuit 2211 and the second switching circuit 2212 each include a triode or a relay switch.

Thus, the efficiency of the charge/discharge switching module 221 for free switching of charge/discharge between the battery and the motor 210, the motor 210 and the external device, and the battery and the external device is improved through the triode or the relay switch.

In other implementations, not shown in the drawing, the first switching circuit 2211 includes a diode and the second switching circuit 2212 includes a switch; or the first switching circuit 2211 includes a switch and the second switching circuit 2212 includes a diode.

Thus, the efficiency of the charge/discharge switching module 221 for free switching of charge/discharge between the battery and the motor 210, the motor 210 and the external device, and the battery and the external device is improved through the free combination of diodes and switches in parallel.

In some embodiments, not shown in the drawing, a sixth switch is provided between the connection point of the first switching circuit 2211 with the second switching circuit 2212 and the neutral point of the M-phase motor 210. Thereby, a flexible switching between the first switching circuit 2211 or the second switching circuit 2212 and the neutral point of the motor 210 in the charge/discharge switching module 221 is achieved through the sixth switch, thus ensuring free switching of charge/discharge.

In some embodiments, not shown in the drawing, the second switch K2 is connected in parallel to a branch circuit, which includes a resistor and a seventh switch connected in series. Thus, the resistor and the seventh switch branch circuit that are connected in series enable flexible cooperation with the second switch K2 and thus accurate regulation of the charge/discharge voltage between the external charge/discharge device and the power module 240.

As shown in FIG. 2, in some embodiments, the power module 240 is connected with a first voltage stabilizing capacitor C1 in parallel at the two ends and the charge/discharge interface 260 is connected with a second voltage stabilizing capacitor C2 in parallel at the two ends.

Then, the stability and continuity of the voltage at two ends of the power module 240 or of the charge/discharge interface 260 during charging/discharging is ensured through the first voltage stabilizing capacitor C1 and the second voltage stabilizing capacitor C2.

In addition, please refer to FIG. 2 for a further description of the circuit as follows:

The first switch K1, the second switch K2, the third switch K3, the fourth switch K4, and the fifth switch K5 in the switch module can be relay switches, and the control module controls the on or off of these switches to form different loops.

The bridge arm group 222 and the charge/discharge switching module 221 can be implemented by an inverter in the drive system of the motor 210, where the inverter can be implemented using bridge arm switches of an insulated gate bipolar transistor (IGBT). The number of bridge arms in the bridge arm group 222 is the same as the number of inductors in the motor 210. For example, if the motor 210 is a three-phase motor 210, the inverter includes three phases of bridge arms, that is, it includes a U-phase bridge arm, a V-phase bridge arm, and a W-phase bridge arm. Among them, each phase of bridge arm of the three phases of bridge arms has an upper bridge arm and a lower bridge arm, and each of the upper and lower bridge arms is provided with a switch unit, that is, the bridge arm group 222 includes an upper bridge arm switch 1211 and a lower bridge arm switch 1212 in the U-phase bridge arm, an upper bridge arm switch 1213 and a lower bridge arm switch 1214 in the V-phase bridge arm, and an upper bridge arm switch 1215 and a lower bridge arm switch 1216 in the W-phase bridge arm, respectively. The charge/discharge switching module 221 also has an upper bridge arm and a lower bridge arm, each of which is provided with a switch unit, that is, the charge/discharge switching module 221 includes an upper bridge arm switch 1221 and a lower bridge arm switch 1222.

The M-motor 210 may include a plurality of inductors, and currents flowing through all the windings of the M-phase motor are of equal magnitude and in the same phase. Take the three-phase motor 210 as an example, three inductors may be included, specifically: an inductor connected to the U-phase bridge arm, an inductor connected to the V-phase bridge arm, and an inductor connected to the W-phase bridge arm. Among them, one end of an inductor is connected to the connection point of the upper and lower bridge arms in the U-phase bridge arm, one end of an inductor is connected to the connection point of the upper and lower bridge arms in the V-phase bridge arm, and one end of an inductor is connected to the connection point of the upper and lower bridge arms in the W-phase bridge arm. The other end of the inductor, the other end of the inductor, and the other end of the inductor are connected together at a connection point that is the three-phase center point of the motor 210.

It should be noted that the motor 210 is not limited to being the three-phase motor 210, but may also be a six-phase motor 210, and the like, and correspondingly, the six-phase motor 210 may include six phases of bridge arms.

The second capacitor C2 is used to stabilize the input voltage of the charge/discharge interface 260, and to absorb the spike voltage of the charge/discharge switching module 221 when it is disconnected, so as to avoid damage to the charge/discharge switching module 221. Both the first capacitor C1 and the second capacitor C2 can play a role such as voltage stabilization and noise filtering.

The power battery voltage regulation system provided in embodiments of the present application fully considers the requirement for voltage regulation when charging and discharging the power module 240 under different circumstances, and provides switches at key points in the charge/discharge loops of the power module 240, and forms loops for buck charging, boost charging, boost discharging, and buck discharging separately in the same circuit structure by controlling the on and off of different switches in the switch module, so that the charge/discharge voltage of the power module 240 can be flexibly adjusted without replacing the circuit structure so as to meet the requirement of charge voltage or discharge voltage of the power module 240 under different scenarios.

Figure 3:
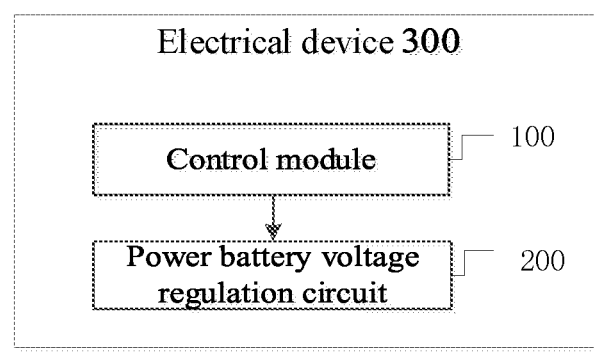
FIG. 3 is a schematic block diagram of an electrical device provided in an embodiment of the present application.

FIG. 3 is a schematic block diagram of an electrical device 300 provided in an embodiment of the present application.

As shown in FIG. 3, the electrical device 300 includes a control module 100 and a power battery voltage regulation circuit 200.

The control module is connected to the switch module and the voltage regulation switch assembly and is used for controlling the voltage regulation switch assembly and the switch module to regulate the charge/discharge voltage between the external charge/discharge device and the power module 240.

Optionally, the apparatus for acquiring the battery voltage and the output voltage may be a BMS in the control module, and the apparatus for controlling the on or off of switches in the switch module may be a micro control unit (MCU) in the control module or may be a motor controller. The BMS can compare the acquired battery voltage with the output voltage to determine the charging manner, and communicate with the MCU. For example, when the battery voltage is less than the output voltage, the BMS sends first information to the MCU, the first information being used to indicate that charging is performed in a buck charging manner, then the MCU can control the on or off of the corresponding switch according to the first information to form a charging loop for buck charging.

On this basis, the electrical device provided in this implementation then, through the control module and the power battery voltage regulation circuit, realizes the switching among different charge/discharge loops, and then realizes flexible and efficient regulation of the charge/discharge voltage between the external charge/discharge device and the power module 240 under different charge/discharge requirements under the voltage regulation control signal, for example: forming loops for buck charging, boost charging, boost discharging, and buck discharging separately in the same circuit structure, so as to meet the charge voltage or discharge voltage requirements of the power module 240 under different scenarios.

Figure 4:
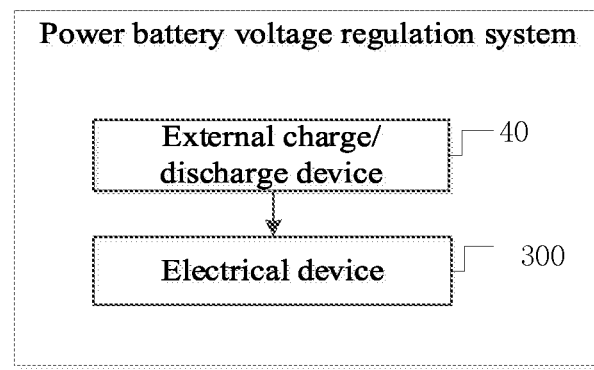
FIG. 4 is a schematic block diagram of a power battery voltage regulation system provided in an embodiment of the present application.

FIG. 4 is a schematic block diagram of a power battery voltage regulation system provided in embodiments of the present application.

As shown in FIG. 4, the present application provides a power battery voltage regulation system including an external charge/discharge device 40 and an electrical device 300, the external charge/discharge device 40 being connected to the charge/discharge interface 260 in the electrical device 300.

On this basis, the power battery voltage regulation system provided in embodiments of the present application, through the external charge/discharge device and the electrical device, realizes the switching among different charge/discharge loops, and then realizes flexible and efficient regulation of the charge/discharge voltage between the external charge/discharge device and the power module 240 under different charge/discharge requirements under the voltage regulation control signal, for example: forming loops for buck charging, boost charging, boost discharging, and buck discharging separately in the same circuit structure, so as to meet the charge voltage or discharge voltage requirements of the power module 240 under different scenarios.

Figure 5:
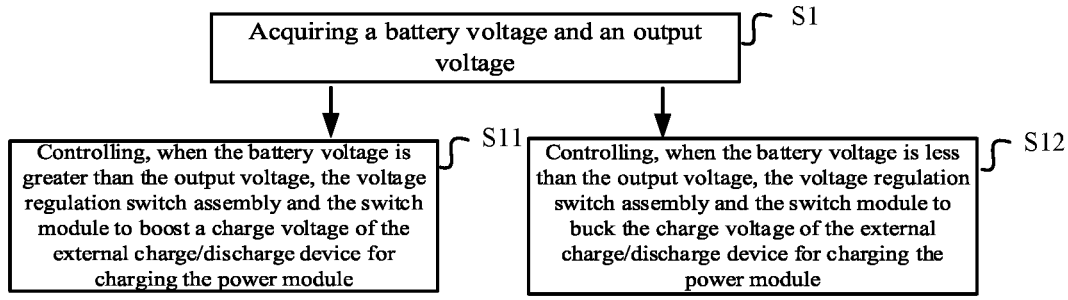
FIG. 5 is a schematic flowchart of a control method for a power battery voltage regulation system provided in an embodiment of the present application.

FIG. 5 is a schematic flowchart of a control method for a power battery voltage regulation system provided in an embodiment of the present application.

As shown in FIG. 5, the power battery voltage regulation method is applied to the power battery voltage regulation system of the third aspect, specifically including the following steps:

S1: during the charge/discharge process of the external charge/discharge device and the electrical device, acquiring a first voltage of a power module 240 and acquiring a second voltage of an external charge/discharge device.

Then, according to the first voltage and the second voltage, the voltage regulation switch assembly and the switch module are controlled to regulate a charge/discharge voltage between the external charge/discharge device and the power module 240.

On this basis, the power battery voltage regulation method of this implementation, through the voltage regulation switch assembly and the switch module in the power battery voltage regulation system, realizes the switching among different charge/discharge loops, and then realizes flexible and efficient regulation of the charge/discharge voltage between the external charge/discharge device and the power module 240 under different charge/discharge requirements under the voltage regulation control signal, for example: forming loops for buck charging, boost charging, boost discharging, and buck discharging separately in the same circuit structure, so as to meet the charge voltage or discharge voltage requirements of the power module 240 under different scenarios.

In one implementation scenario, the first voltage is the battery voltage of the power module 240, and the second voltage is the output voltage of the external charge/discharge device.

Controlling, according to the first voltage and the second voltage, the voltage regulation switch assembly and the switch module to regulate a charge/discharge voltage between the external charge/discharge device and the power module 240 specifically includes:

S11: controlling, when the battery voltage is greater than the output voltage, the voltage regulation switch assembly and the switch module to boost a charge voltage of the external charge/discharge device for charging the power module.

S12: controlling, when the battery voltage is less than the output voltage, the voltage regulation switch assembly and the switch module to buck the charge voltage of the external charge/discharge device for charging the power module.

The power battery voltage regulation method provided on this basis can flexibly regulate the charge voltage of the power module 240 according to the relationship between voltages of the charging device and the power module 240, while using the circuit structure of the power battery voltage regulation system itself to provide energy to the motor 210, thus enabling boost charging of the power module 240 through the on and off of different switches in the same circuit. This enables the charging device to charge both a power module 240 having a voltage lower than the maximum output voltage of the charging device and a power module 240 having a higher voltage compared to the maximum output voltage of the charging device. The control method can flexibly adjust the charge voltage of the power module 240 in different scenarios, which can solve the compatibility problem of external charge/discharge device and also make the charge process of the power module 240 not limited by the maximum output voltage of the charging device.

Specifically, in the power battery voltage regulation method, step S11 specifically includes: controlling, when the battery voltage is greater than the output voltage, the voltage regulation switch assembly and the switch module to boost a charge voltage of the external charge/discharge device for charging the power module specifically includes: controlling, in a first time period, the external charge/discharge device to charge the energy storage element; and controlling, in a second time period, the external charge/discharge device and the energy storage element together to charge the power battery. It is possible, when the battery voltage is greater than the output voltage, to first control the external charge/discharge device to charge the energy storage element, and then control the external charge/discharge device and the energy storage element to charge the power battery together, without changing the circuit structure, thus realizing continuous boost charging.

Figure 6:
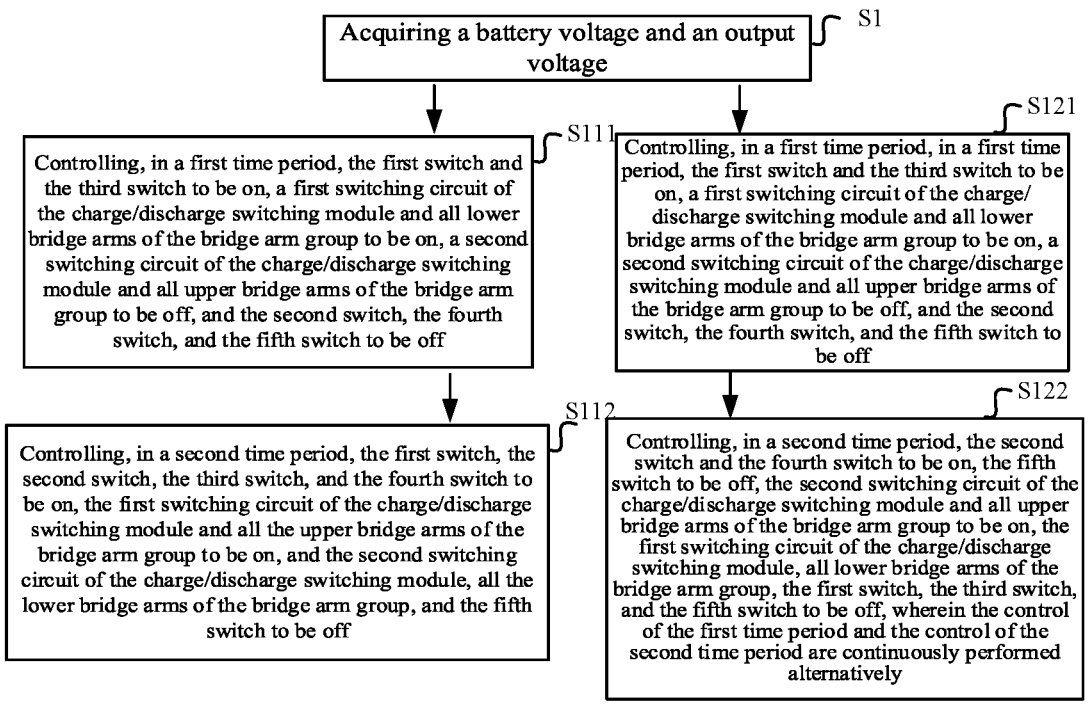
FIG. 6 is a schematic flowchart of a control method for a power battery voltage regulation system provided in another embodiment of the present application.

As shown in FIG. 6, S111: controlling, in a first time period, the first switch and the third switch to be on, a first switching circuit of the charge/discharge switching module and all lower bridge arms of the bridge arm group to be on, a second switching circuit of the charge/discharge switching module and all upper bridge arms of the bridge arm group to be off, and the second switch, the fourth switch, and the fifth switch to be off.

Figure 7:
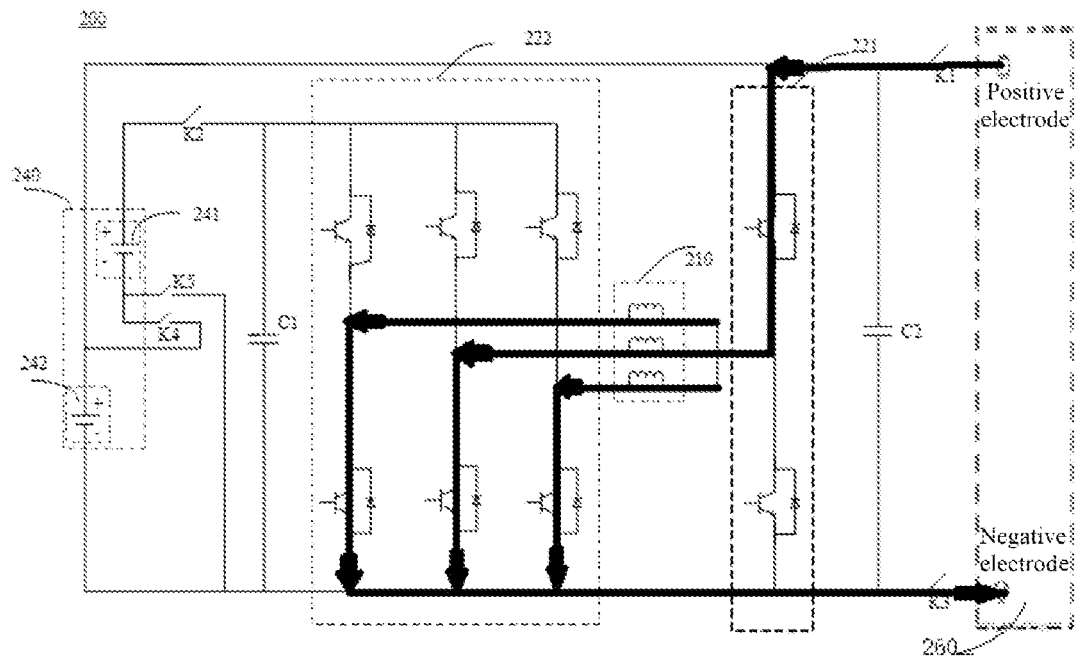
FIGS. 7, 8, and 9 are schematic diagrams of different charging loops for charging a power module by the power battery voltage regulation system provided in embodiments of the present application.

FIG. 7 is a schematic diagram of a corresponding charging loop of the power battery voltage regulation system at this time.

As shown in FIG. 7, at this time, the external charge device is in conduction with the motor inductor through the charge/discharge interface, and the motor inductor performs energy storage. The charging device only provides electrical energy to the motor 210, and the motor 210 stores energy through its own inductor.

S112: controlling, in a second time period, the first switch, the second switch, the third switch, and the fourth switch to be on, the first switching circuit of the charge/discharge switching module and all the upper bridge arms of the bridge arm group to be on, and the second switching circuit of the charge/discharge switching module, all the lower bridge arms of the bridge arm group, and the fifth switch to be off.

Figure 8:
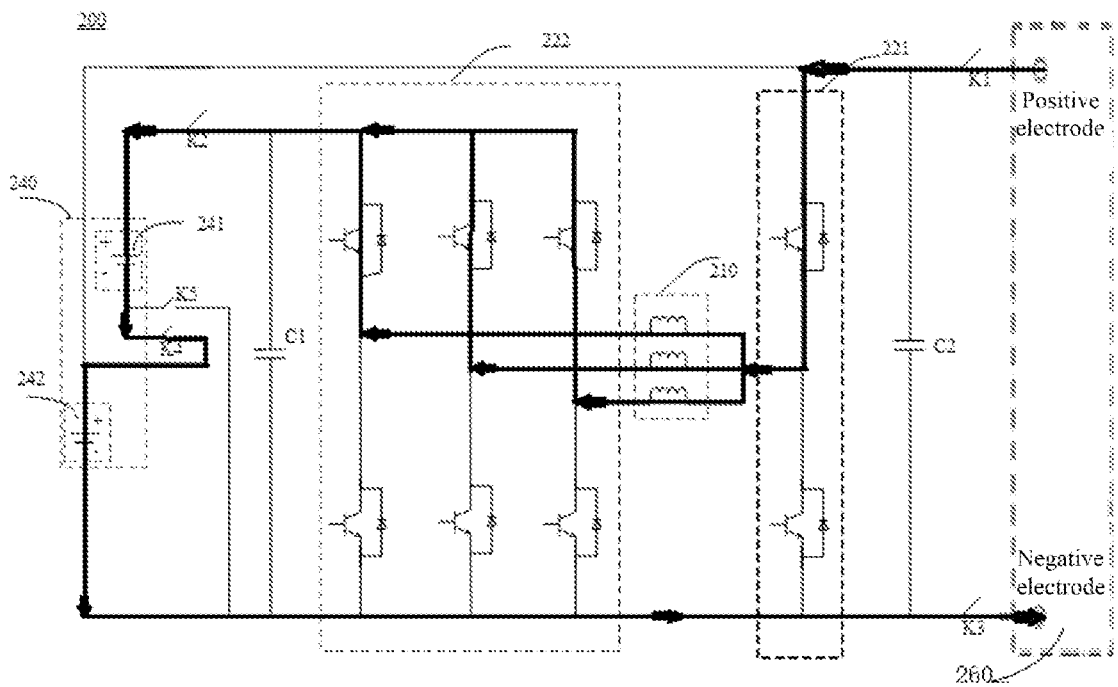

FIG. 8 is a schematic diagram of a corresponding charging loop of the power battery voltage regulation system at this time.

As shown in FIG. 8, at this time, the external charging pile is connected to the battery via the charge/discharge interface and the motor inductor, and the inductor and the external charging pile jointly charge the battery.

The charging device as well as the motor 210 which pre-stores energy jointly provide electrical energy to the power module 240, that is, the voltage provided by the charging device is superimposed with the voltage provided by the motor 210, and the superimposed voltage is greater than the voltage of the power module 240 so that it can charge the power module 240. The motor 210 can pre-store energy through the circuit in the power battery voltage regulation system, or the motor 210 can be supplied with energy by an external device.

Finally, the control of the first time period and the control of the second time period are continuously performed alternatively. During the charge process of the power module 240, the continuous simultaneous charging after boosting is achieved through the alternating control of the first time period and the second time period, thereby ensuring the continuity of the charge process.

In embodiments provided based on this implementation, it is possible to flexibly adjust the voltage that is output to the power module 240 according to different voltages of the charging device without changing the circuit structure, while using the circuit structure of the power battery voltage regulation system itself to provide energy to the motor 210, thus enabling the boost of the charge voltage of the external charge/discharge device for charging the power module through the on and off of different switches in the same circuit, so that the charging device can charge the power module 240 having a battery voltage higher than the maximum output voltage of the charging device.

Specifically, in the power battery voltage regulation method, step S12 specifically includes: controlling, when the battery voltage is less than the output voltage, the voltage regulation switch assembly and the switch module to buck the charge voltage of the external charge/discharge device for charging the power module specifically includes: controlling, in a first time period, the external charge/discharge device to charge the energy storage element; and controlling, in a second time period, the energy storage element to charge the power battery. It is possible, when the battery voltage is less than the output voltage, to first control the external charge/discharge device to charge the energy storage element, and then control the energy storage element to charge the power battery, without changing the circuit structure, thus realizing continuous buck charging.

As shown in FIG. 6, S121: controlling, in a first time period, the first switch and the third switch to be on, a first switching circuit of the charge/discharge switching module and all lower bridge arms of the bridge arm group to be on, a second switching circuit of the charge/discharge switching module and all upper bridge arms of the bridge arm group to be off, and the second switch, the fourth switch, and the fifth switch to be off.

FIG. 7 is a schematic diagram of a corresponding charging loop of the power battery voltage regulation system at this time.

As shown in FIG. 7, at this time, the external charge device is in conduction with the motor inductor through the charge/discharge interface, and the motor inductor performs energy storage. The charging device only provides electrical energy to the motor 210, and the motor 210 stores energy through its own inductor.

S122: controlling, in a second time period, the second switch and the fourth switch to be on, the fifth switch to be off, the second switching circuit of the charge/discharge switching module and all upper bridge arms of the bridge arm group to be on, the first switching circuit of the charge/discharge switching module, all lower bridge arms of the bridge arm group, the first switch, the third switch, and the fifth switch to be off, wherein the control of the first time period and the control of the second time period are continuously performed alternatively.

Figure 9:
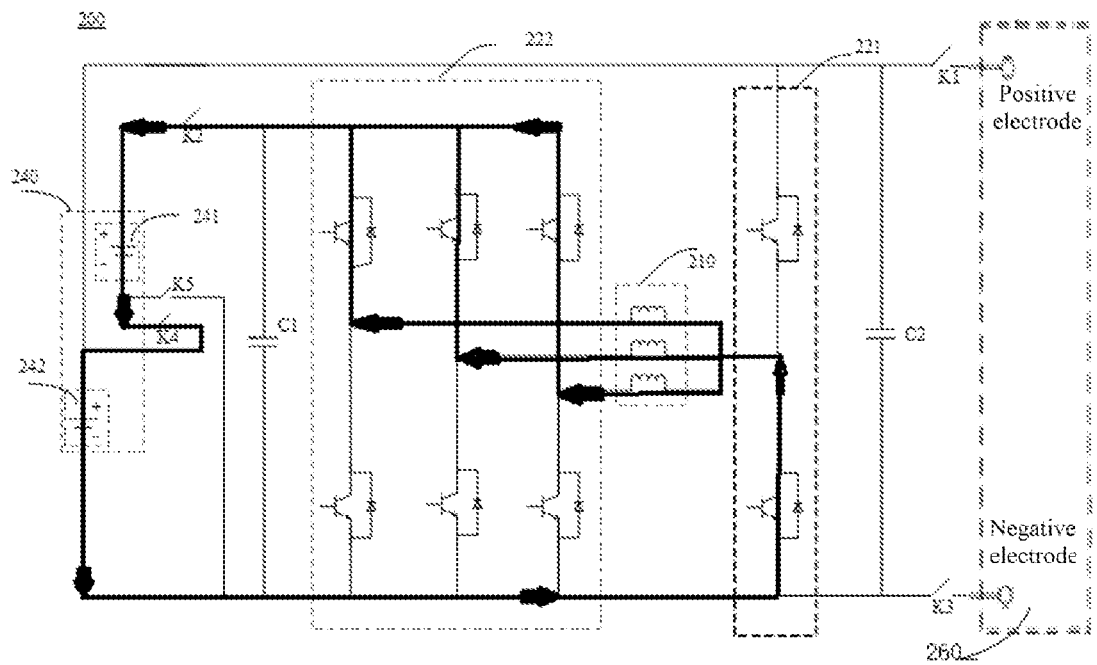

FIG. 9 is a schematic diagram of a corresponding charging loop of the power battery voltage regulation system at this time.

As shown in FIG. 9, an external charging device can be formed to a buck charging circuit for the power module.

With the power battery voltage regulation method provided in embodiments of the present application, it is possible to flexibly adjust the voltage that is output to the power module 240 according to different voltages of the charging device without changing the circuit structure, while using the circuit structure of the power battery voltage regulation system itself to provide energy to the motor 210, thus enabling the buck of the charge voltage of the external charge/discharge device for charging the power module through the on and off of different switches in the same circuit, so that the charging device can charge the power module 240 having a battery voltage lower than the maximum output voltage of the charging device.

In another preferred implementation, in the process of charging the external load by the power module as a power source, both discharging and charging need to go through step S111 or S121, which are the same steps, and both need to first store energy for the motor inductor through the power module.

Therefore, step S111 or S121 is performed first, that is, controlling, in a first time period, the first switch and the third switch to be on, a first switching circuit of the charge/discharge switching module and all lower bridge arms of the bridge arm group to be on, a second switching circuit of the charge/discharge switching module and all upper bridge arms of the bridge arm group to be off, and the second switch, the fourth switch, and the fifth switch to be off. Then, S212 or S222 is performed according to whether boosting or bucking is to be performed. Without further elaboration here, please refer to the contents of the aforementioned solution.

In another implementation scenario, the first voltage is the battery voltage of the power module 240, and the second voltage is the requested voltage of the external charge/discharge device as a load.

Figure 10:
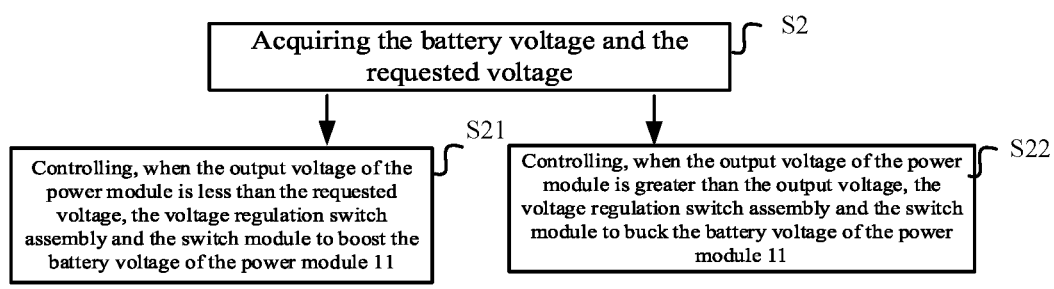
FIG. 10 is a schematic flowchart of a control method for a power battery voltage regulation system provided in another embodiment of the present application.

FIG. 10 is a schematic flowchart of a control method for a power battery voltage regulation system provided in another embodiment of the present application.

As shown in FIG. 10, controlling, according to the first voltage and the second voltage, the voltage regulation switch assembly and the switch module to regulate a charge/discharge voltage between the external charge/discharge device and the power module 240 specifically includes:

S2: during the charge/discharge process between the external charge/discharge device and the electrical device, acquiring the battery voltage of the power module 240, i.e., the first voltage; and taking the external charge/discharge device as a load, acquiring the requested voltage of the external charge/discharge device, i.e., the second voltage.

Then, according to the battery voltage and the requested voltage, the voltage regulation switch assembly and the switch module are controlled to regulate the charge/discharge voltage between the external charge/discharge device and the power module 240.

On this basis, the control method for the power battery voltage regulation system provided in this implementation can be adapted to various load devices having different required voltages under different circumstances by controlling the voltage regulation switch assembly and the switch module without changing the circuit structure, so that the power battery voltage regulation system can provide electrical energy to both a load device having a required voltage higher than the voltage of the power module 240 and a load device having a required voltage lower than the voltage of the power module 240, thus realizing flexible adjustment of the discharge voltage of the power module 240 under different scenarios so as to provide electrical energy to various load devices.

Specifically, controlling, according to the battery voltage and the requested voltage, the voltage regulation switch assembly and the switch module to regulate a charge/discharge voltage between the external charge/discharge device and the power module 240 specifically includes:

S21: controlling, when the output voltage of the power module is less than the requested voltage, the voltage regulation switch assembly and the switch module to boost the battery voltage of the power module 240.

S22: controlling, when the output voltage of the power module is greater than the requested voltage, the voltage regulation switch assembly and the switch module to buck the battery voltage of the power module 240.

Under different circumstances, by controlling the voltage regulation switch assembly and the switch module, the power battery voltage regulation system can provide electrical energy to both a load device having a required voltage higher than the voltage of the power module 240 and a load device having a required voltage lower than the voltage of the power module 240, thus realizing flexible adjustment of the discharge voltage of the power module 240 under different scenarios so as to provide electrical energy to various load devices.

Specifically, in the power battery voltage regulation method, step S21 specifically includes: controlling, in a first time period, the power battery to charge the energy storage element; and controlling, in a second time period, the power battery and the energy storage element together to charge the external charge/discharge device. When the output voltage of the power module is less than the requested voltage, it is possible to first control the power battery to charge the energy storage element, and then control the power battery and the energy storage element to charge the external charge/discharge device together, without changing the circuit structure, thus realizing continuous boost discharging.

Figure 11:
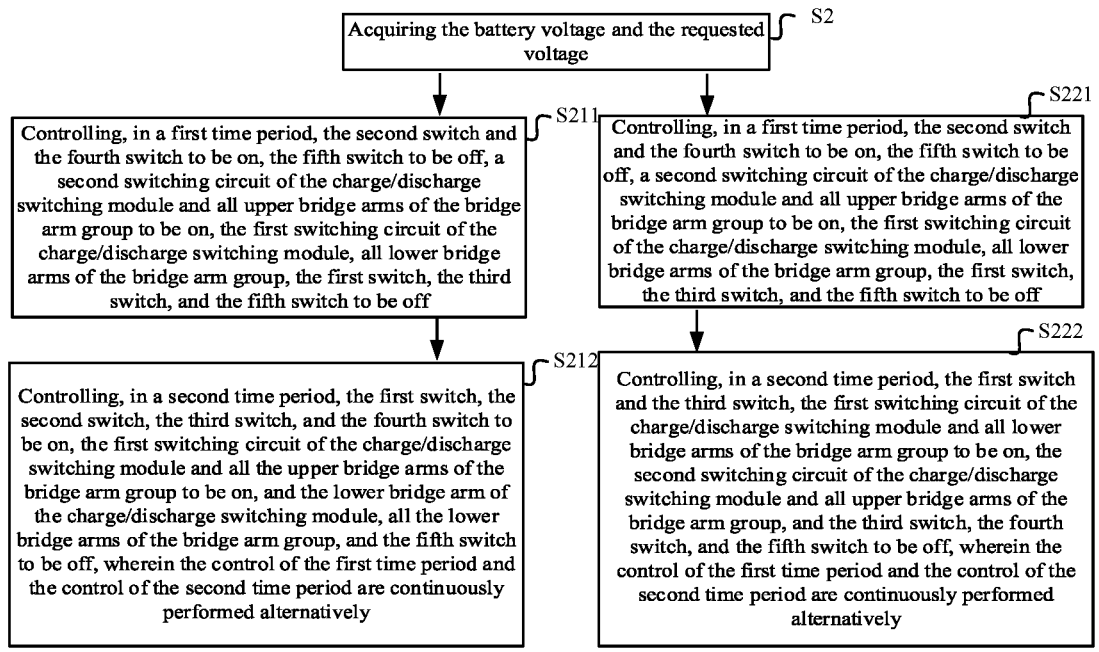
FIG. 11 is a schematic flowchart of a control method for a power battery voltage regulation system provided in another embodiment of the present application.

As shown in FIG. 11, S211: controlling, in a first time period, the second switch and the fourth switch to be on, the fifth switch to be off, a second switching circuit of the charge/discharge switching module and all upper bridge arms of the bridge arm group to be on, the first switching circuit of the charge/discharge switching module, all lower bridge arms of the bridge arm group, the first switch, the third switch, and the fifth switch to be off.

Figure 12:
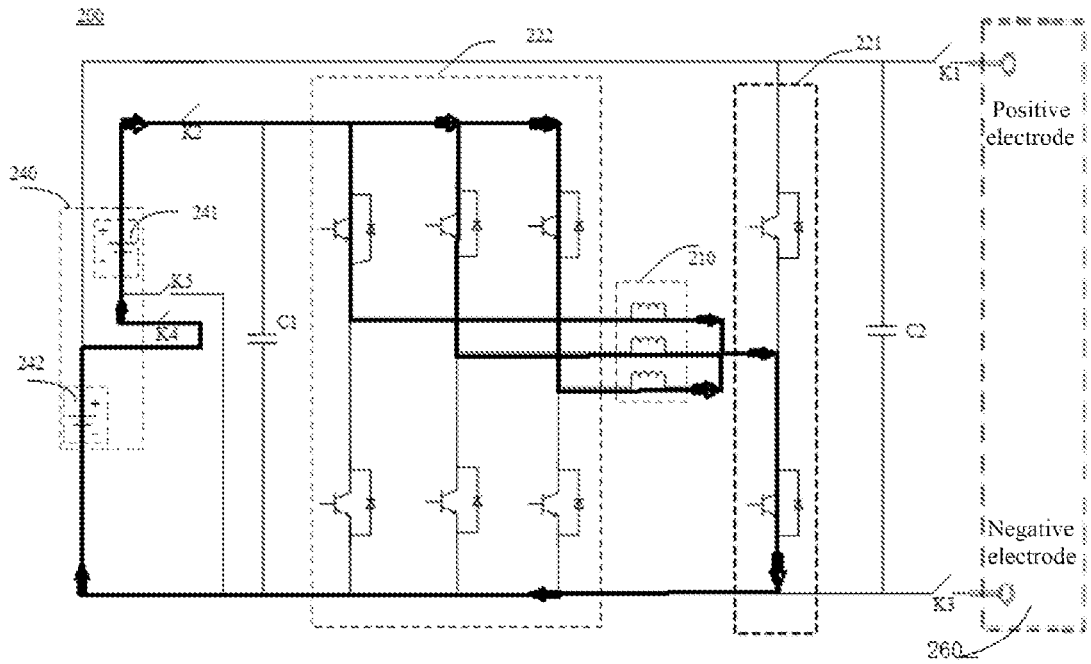
FIGS. 12, 13 and 14 are schematic diagrams of different charging loops for charging an external load of the power battery voltage regulation system provided in embodiments of the present application.

FIG. 12 is a schematic diagram of a corresponding charging loop of the power battery voltage regulation system at this time.

As shown in FIG. 12, at this time, the use of battery energy to store energy for the motor inductor is achieved, where the power module 240 provides electrical energy only to the motor 210 and the motor 210 stores energy through its own inductor.

S212: controlling, in a second time period, the first switch, the second switch, the third switch, and the fourth switch to be on, the first switching circuit of the charge/discharge switching module and all the upper bridge arms of the bridge arm group to be on, and the second switching circuit of the charge/discharge switching module, all the lower bridge arms of the bridge arm group, and the fifth switch to be off.

Figure 13:
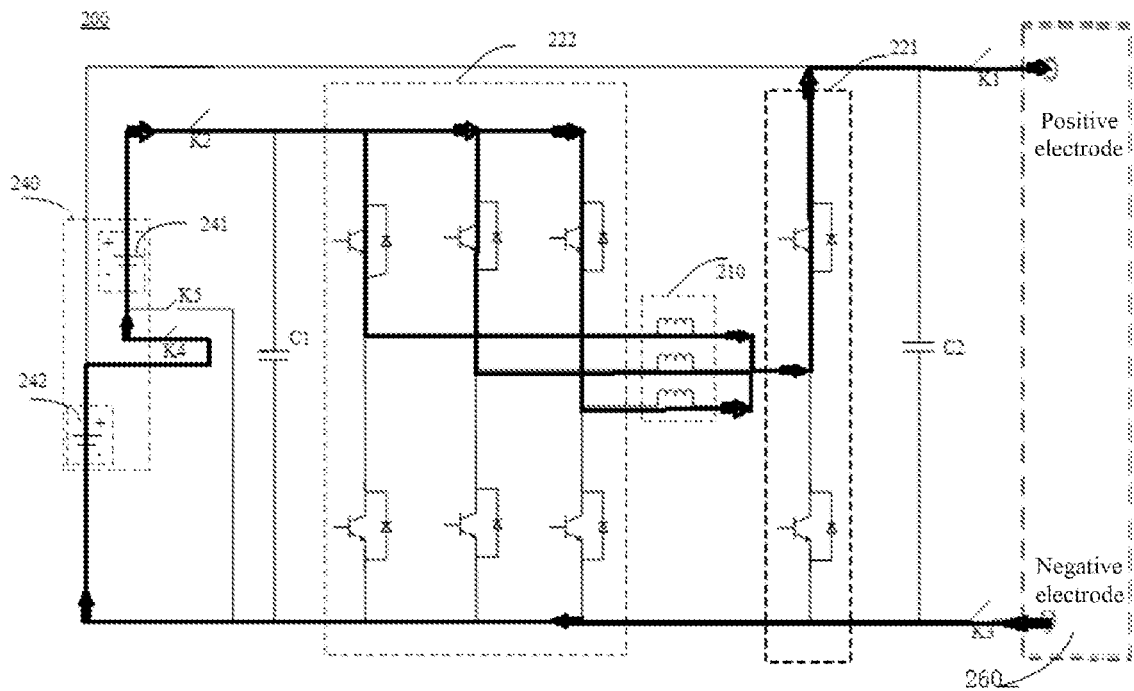

FIG. 13 is a schematic diagram of a corresponding charging loop of the power battery voltage regulation system at this time.

As shown in FIG. 13, at this time, the battery voltage of the power module 240 is boosted, and the battery and motor inductor are used as power sources to output power to the external load.

The power module 240 as well as the motor 210 that pre-stores energy together provide electrical energy to the load device, that is, the voltage provided by the power module 240 is superimposed with the voltage provided by the motor 210, and the superimposed voltage can match the requested voltage of the load device so that it can provide electrical energy to the load device.

Finally, the control of the first time period and the control of the second time period are continuously performed alternatively. During the charge process of the power module 240, the continuous discharging after boosting is achieved through the alternating control of the first time period and the second time period, thereby ensuring the continuity of the discharge process.

In embodiments provided in the present application, it is possible to flexibly regulate the output voltage according to the requirement of the load device without changing the circuit structure, while using the circuit structure of the power battery voltage regulation system itself to provide energy for the motor 210, thus enabling boost discharging of the power module 240 through the on and off of different switches in the same circuit, so that the power battery voltage regulation system can provide electrical energy for the load device having a required voltage higher than the voltage of the power module 240.

Specifically, in the power battery voltage regulation method, when the battery voltage is greater than the output voltage, step S22 specifically includes: controlling, in a first time period, the power battery to charge the energy storage element; and controlling, in a second time period, the energy storage element to charge the external charge/discharge device. When the output voltage of the power module is greater than the requested voltage, it is possible to first control the power battery to charge the energy storage element, and then control the energy storage element to charge the external charge/discharge device, without changing the circuit structure, thus realizing continuous buck discharging.

As shown in FIG. 11, S221: controlling, in a first time period, the second switch and the fourth switch to be on, the fifth switch to be off, a second switching circuit of the charge/discharge switching module and all upper bridge arms of the bridge arm group to be on, the first switching circuit of the charge/discharge switching module, all lower bridge arms of the bridge arm group, the first switch, the third switch, and the fifth switch to be off.

FIG. 12 is a schematic diagram of a corresponding charging loop of the power battery voltage regulation system at this time.

As shown in FIG. 12, at this time, the use of battery energy to store energy for the motor inductor is achieved. The power module 240 provides electrical energy only to the motor 210 and the motor 210 stores energy through its own inductor.

S222: controlling, in a second time period, the first switch and the third switch, the first switching circuit of the charge/discharge switching module and all lower bridge arms of the bridge arm group to be on, the second switching circuit of the charge/discharge switching module and all upper bridge arms of the bridge arm group, and the third switch, the fourth switch, and the fifth switch to be off.

Figure 14:
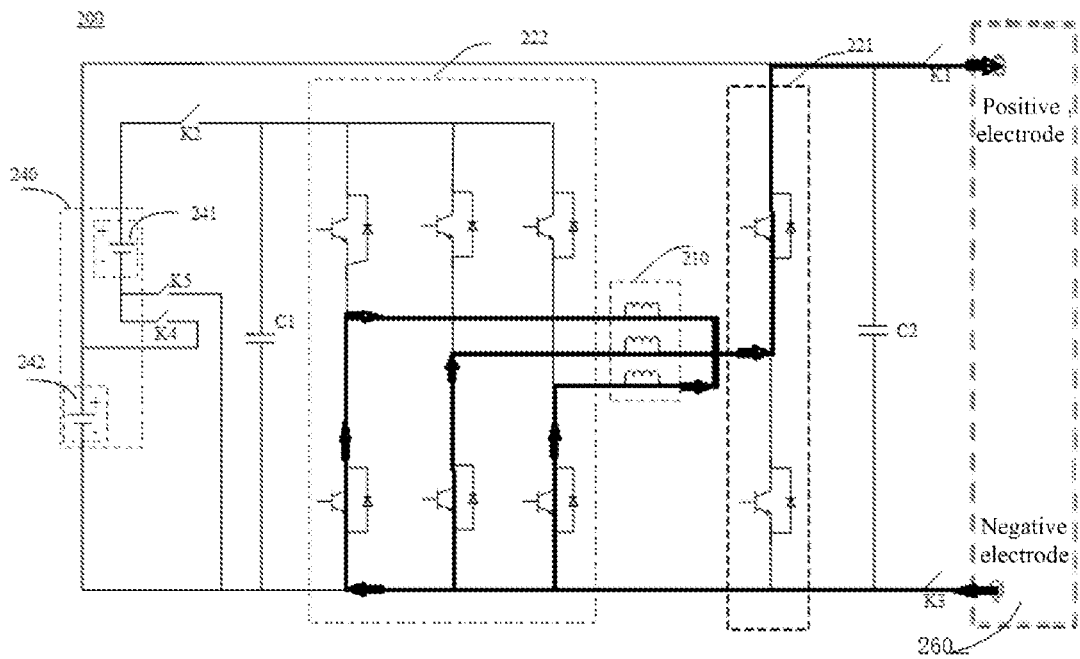

FIG. 14 is a schematic diagram of a corresponding charging loop of the power battery voltage regulation system at this time.

As shown in FIG. 14, at this time, the battery voltage of the power module 240 is bucked, and the motor inductor is used as a power source to output power to the external load.

In the loop formed for buck charging, only the motor 210 that pre-stores energy provides electrical energy to the load device, where the pre-stored energy in the motor 210 can be provided by the circuit of the power battery voltage regulation system itself.

Finally, the control of the first time period and the control of the second time period are continuously performed alternatively. During the charge process of the power module 240, the continuous discharging after bucking is achieved through the alternating control of the first time period and the second time period, thereby ensuring the continuity of the discharge process.

In summary, it is possible to flexibly regulate the output voltage according to the requirement of the load device without changing the circuit structure, while using the circuit structure of the power battery voltage regulation system itself to provide energy for the motor 210, thus enabling buck discharging of the power module 240 through the on and off of different switches in the same circuit, so that the power battery voltage regulation system can provide electrical energy for a load device having a required voltage lower than the voltage of the power module 240.

In another preferred implementation, in the process of charging the external load by the power module as a power source, both discharging and charging need to go through step S211 or S221, which are the same steps, and both need to first store energy for the motor inductor through the power module.

Therefore, step S211 or S221 is performed first, that is: controlling, in a first time period, the second switch and the fourth switch to be on, the fifth switch to be off, a second switching circuit of the charge/discharge switching module and all upper bridge arms of the bridge arm group to be on, the first switching circuit of the charge/discharge switching module, all lower bridge arms of the bridge arm group, the first switch, the third switch, and the fifth switch to be off.

Then, S212 or S222 is performed according to whether boosting or bucking is to be performed. Without further elaboration here, please refer to the contents of the aforementioned solution.

Figure 15:
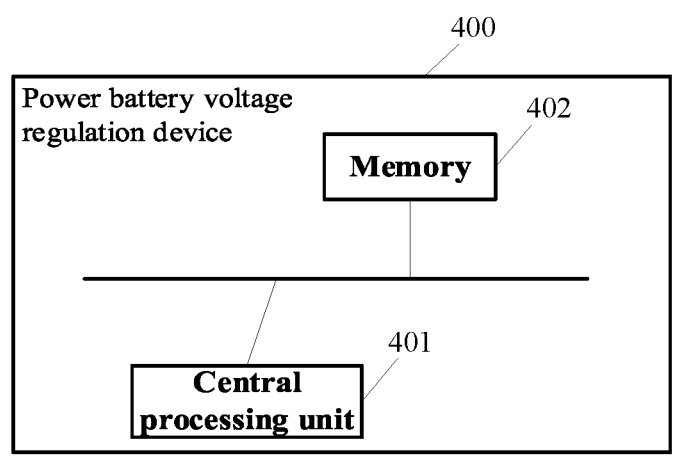
FIG. 15 is a schematic structural diagram of the power module voltage regulation provided in an embodiment of the present application.

FIG. 15 illustrates a schematic structural diagram of a power module voltage regulation device 400 according to an embodiment of the present application.

As shown in FIG. 15, the power module voltage regulation device 400, includes: a memory 402 for storing executable instructions; and a central processing unit 401 for connecting to the memory 402 to execute the executable instructions so as to complete the power battery voltage regulation method.

It can be understood by those skilled in the art that the schematic diagram 15 is only an example of the power module voltage regulation device 400 and does not constitute a limitation to the power module voltage regulation device 400, and it may include more or fewer components than those shown in the drawing, or combine certain components, or different components, for example, the power module voltage regulation device 400 may also include input/output devices, network access devices, buses, and the like.

The central processing unit 401 (CPU) may also be other general purpose processors, digital signal processors (DSPs), application specific integrated circuits (ASICs), field-programmable gate arrays (FPGAs) or other programmable logic devices, discrete gates or transistor logic devices, discrete hardware components, among others. The general purpose processor may be a microprocessor or the central processing unit 401 may also be any conventional processor, and the like. The central processing unit 401 is the control center of the power module voltage regulating device 400 and connects various parts of the entire power module voltage regulation device 400 using various interfaces and lines.

The memory 402 may be used to store computer-readable instructions, and the central processing unit 401 implements various functions of the power module voltage regulation device 400 by running or executing computer-readable instructions or modules stored in the memory 402, and by invoking data stored in the memory 402. The memory 402 may primarily include a program storage area and a data storage area, wherein the program storage area may store an operating system, applications required for at least one function (e.g., a sound playback function, an image playback function, etc.), and the like; and the data storage area may store data created in accordance with the use of the power module voltage regulation device 400, and the like. In addition, the memory 402 may include a hard disk, a memory, a plug-in hard disk, a smart media card (SMC), a secure digital (SD) card, a flash card, at least one disk memory device, a flash memory device, a read-only memory (ROM), a random access memory (RAM), or other non-volatile/volatile memory devices.

The modules integrated in the power module voltage regulation device 400, if implemented as a software function module and sold or used as a stand-alone product, may be stored in a computer-readable storage medium. Based on such understanding, the present invention realizes all or part of the processes in the methods of the above embodiments, which can also be accomplished by instructing relevant hardware through computer-readable instructions, wherein the computer-readable instructions can be stored in a computer-readable storage medium, and the computer-readable instructions, when executed by the central processing unit, can realize the steps of the above method embodiments.

The power module voltage regulation device provided in embodiments of the present application, through the voltage regulation switch assembly and the switch module in the power battery voltage regulation system, realizes the switching among different charge/discharge loops, and then realizes flexible and efficient regulation of the charge/discharge voltage between the external charge/discharge device and the power module 240 under different charge/discharge requirements under the voltage regulation control signal, for example: forming loops for buck charging, boost charging, boost discharging, and buck discharging separately in the same circuit structure, so as to meet the charge voltage or discharge voltage requirements of the power module 240 under different scenarios.

Finally, the present application also provides a computer-readable storage medium having a computer program stored thereon, wherein the computer program is executed by a central processing unit to implement the power battery voltage regulation method.

Those of ordinary skill in the art can realize that units and algorithm steps of each example described with reference to the examples disclosed herein can be implemented in electronic hardware, or a combination of computer software and electronic hardware. Whether these functions are performed in hardware or software depends on a specific application and a design constraint condition of the technical solution. Those skilled in the art can implement the described functions using different methods for each particular application, but such implementations should not be considered beyond the scope of the present application.

Those skilled in the art can clearly understand that, for the convenience and brevity of description, the specific working process of the system, apparatus, and unit described above may be obtained with reference to the corresponding process in the foregoing method embodiments, which will not be repeated here.

In the several examples provided in the present application, it should be understood that the disclosed system, apparatus, and method may be implemented in other manners. For example, the apparatus example described above is only illustrative. For example, the division of the units is only a logical function division. In an actual implementation, there may be other division methods. For example, a plurality of units or components may be combined or may be integrated into another system, or some features may be ignored, or not implemented. On the other hand, the shown or discussed mutual coupling or direct coupling or communication connection may be indirect coupling or communication connection through some interfaces, apparatuses, or units, and may be in electrical, mechanical, or in other forms.

The units described as separate components may or may not be physically separated, and components displayed as units may or may not be physical units, that is, may be located in one place, or may be distributed to a plurality of network units. Some or all of the units may be selected according to actual needs to achieve the purpose of the solution in this embodiment.

Alternatively, the various functional units in various embodiments of the present application may be integrated in a single processing unit, or may be physically present separately, or two or more units may be integrated in a single unit.

The functions may be stored in a computer-readable storage medium if implemented as a software functional unit and sold or used as a separate product. Based on such understanding, the technical solution of the present application, or the part of the technical solution that essentially contributes to the prior art, can be embodied in the form of a software product, wherein this computer software product is stored in a storage medium and includes a number of instructions to cause a computer device (which may be a personal computer, a server, or a network device, etc.) to perform all or some of the steps of the methods described in various embodiments of the present application. The aforementioned storage media include: a USB flash drive, a portable hard disk, a read-only memory (ROM), a random access memory (RAM), a magnetic disk or an optical disk, and other media that can store program code.

What mentioned above is only the specific implementation of the present application, but the scope of protection of the present application is not limited to this, and any person skilled in the art can easily think of variations or substitutions within the technical scope disclosed in the present application, which should be covered by the scope of protection of the present application. Therefore, the scope of protection of the present application shall be stated to be subject to the scope of protection of the claims.

What is claimed is:

1. A power battery voltage regulation circuit, comprising a power module, a heating module, a charge/discharge interface, and a voltage regulation switch assembly, wherein
   the heating module comprises an energy storage element and a switch module;
   the power module comprises at least a first power battery and a second power battery;
   the power module is connected in parallel with the switch module; and an external charge/discharge device is connected in parallel with the power module through the charge/discharge interface;
   the voltage regulation switch assembly comprises a plurality of switches that are provided between the charge/discharge interface and the power module; and
   the voltage regulation switch assembly and the switch module are for regulating, in response to a voltage regulation control signal, a charge/discharge voltage between the external charge/discharge device and the power module,
   the plurality of switches of the voltage regulation switch assembly further comprises a first switch, a second switch, a third switch, a fourth switch, and a fifth switch; the first switch and the third switch are provided on a positive electrode side and a negative electrode side of the charge/discharge interface, respectively; the second switch is provided between a positive electrode side of the first power battery and a first end of the switch module; the fifth switch is provided between a negative electrode side of the first power battery and a second end of the switch module; and the fourth switch is provided between the negative electrode side of the first power battery and a positive electrode side of the second power battery,
   the switch module comprises a charge/discharge switching module and a bridge arm group connected in parallel, one end of the first switch is connected to the positive electrode side of the charge/discharge interface and the other end of the first switch is connected to a first end of the charge/discharge switching module; one end of the third switch is connected to the negative electrode side of the charge/discharge interface and the other end of the third switch is connected to a second end of the charge/discharge switching module; one end of the second switch is connected to the positive electrode side of the first power battery and the other end of the second switch is connected to all upper bridge arms of the bridge arm group in a common line; and one end of the fifth switch is connected to the negative electrode side of the first power battery, and the other end of the fifth switch, all lower bridge arms of the bridge arm group, and the second end of the charge/discharge switching module are connected in a common line, the positive electrode side of the second power battery is further connected to the first end of the charge/discharge switching module.

2. The regulation circuit according to claim 1, wherein the switch module comprises a charge/discharge switching module and a bridge arm group connected in parallel, a first end of the energy storage element being connected to the bridge arm group and a second end of the energy storage element being connected to the charge/discharge switching module.

3. The regulation circuit according to claim 2, wherein the energy storage element comprises an M-phase motor; the bridge arm group comprises M phases of bridge arms, M being a positive integer; M phases of windings of the M-phase motor are connected to upper and lower bridge arm connection points of phases of bridge arm of the M phases of bridge arms on a one-to-one corresponding basis, respectively; and
   the charge/discharge switching module comprises a first switching circuit and a second switching circuit connected in series, a connection point of the first switching circuit with the second switching circuit being connected to a neutral point of the M-phase motor.

4. The regulation circuit according to claim 3, wherein the first switching circuit and the second switching circuit each comprise a triode and a flyback diode connected in parallel.

5. The regulation circuit according to claim 3, wherein the first switching circuit and the second switching circuit each comprise a triode or a relay switch.

6. The regulation circuit according to claim 3, wherein the first switching circuit comprises a diode and the second switching circuit comprises a switch; or the first switching circuit comprises a switch and the second switching circuit comprises a diode.

7. The regulation circuit according to claim 1, wherein the power module is connected with a first voltage stabilizing capacitor in parallel at the two ends and the charge/discharge interface is connected with a second voltage stabilizing capacitor in parallel at the two ends.

8. The regulation circuit according to claim 1, wherein currents flowing through all the windings of the motor are of equal magnitude and in the same phase.

9. An electrical device, comprising a control module and a power battery voltage regulation circuit, wherein
   the power battery voltage regulation circuit comprises a power module, a heating module, a charge/discharge interface, and a voltage regulation switch assembly, the heating module comprises an energy storage element and a switch module; the power module comprises at least a first power battery and a second power battery; the power module is connected in parallel with the switch module; and an external charge/discharge device is connected in parallel with the power module through the charge/discharge interface; the voltage regulation switch assembly comprises a plurality of switches that are provided between the charge/discharge interface and the power module; and the voltage regulation switch assembly and the switch module are for regulating, in response to a voltage regulation control signal, a charge/discharge voltage between the external charge/discharge device and the power module, the plurality of switches of the voltage regulation switch assembly further comprises a first switch, a second switch, a third switch, a fourth switch, and a fifth switch; the first switch and the third switch are provided on a positive electrode side and a negative electrode side of the charge/discharge interface, respectively; the second switch is provided between a positive electrode side of the first power battery and a first end of the switch module; the fifth switch is provided between a negative electrode side of the first power battery and a second end of the switch module; and the fourth switch is provided between the negative electrode side of the first power battery and a positive electrode side of the second power battery, the switch module comprises a charge/discharge switching module and a bridge arm group connected in parallel, one end of the first switch is connected to the positive electrode side of the charge/discharge interface and the other end of the first switch is connected to a first end of the charge/discharge switching module; one end of the third switch is connected to the negative electrode side of the charge/discharge interface and the other end of the third switch is connected to a second end of the charge/discharge switching module; one end of the second switch is connected to the positive electrode side of the first power battery and the other end of the second switch is connected to all upper bridge arms of the bridge arm group in a common line; and one end of the fifth switch is connected to the negative electrode side of the first power battery, and the other end of the fifth switch, all lower bridge arms of the bridge arm group, and the second end of the charge/discharge switching module are connected in a common line, the positive electrode side of the second power battery is further connected to the first end of the charge/discharge switching module, the control module is connected to the switch module and the voltage regulation switch assembly and is used for controlling the voltage regulation switch assembly and the switch module to regulate the charge/discharge voltage between the external charge/discharge device and the power module.

10. A power battery voltage regulation system, comprising an external charge/discharge device and an electrical device, wherein, the electrical device comprises a control module and a power battery voltage regulation circuit, the power battery voltage regulation circuit comprises a power module, a heating module, a charge/discharge interface, and a voltage regulation switch assembly, the heating module comprises an energy storage element and a switch module; the power module comprises at least a first power battery and a second power battery; the power module is connected in parallel with the switch module; and an external charge/discharge device is connected in parallel with the power module through the charge/discharge interface; the voltage regulation switch assembly comprises a plurality of switches that are provided between the charge/discharge interface and the power module; and the voltage regulation switch assembly and the switch module are for regulating, in response to a voltage regulation control signal, a charge/discharge voltage between the external charge/discharge device and the power module, the plurality of switches of the voltage regulation switch assembly further comprises a first switch, a second switch, a third switch, a fourth switch, and a fifth switch; the first switch and the third switch are provided on a positive electrode side and a negative electrode side of the charge/discharge interface, respectively; the second switch is provided between a positive electrode side of the first power battery and a first end of the switch module; the fifth switch is provided between a negative electrode side of the first power battery and a second end of the switch module; and the fourth switch is provided between the negative electrode side of the first power battery and a positive electrode side of the second power battery, the switch module comprises a charge/discharge switching module and a bridge arm group connected in parallel, one end of the first switch is connected to the positive electrode side of the charge/discharge interface and the other end of the first switch is connected to a first end of the charge/discharge switching module; one end of the third switch is connected to the negative electrode side of the charge/discharge interface and the other end of the third switch is connected to a second end of the charge/discharge switching module; one end of the second switch is connected to the positive electrode side of the first power battery and the other end of the second switch is connected to all upper bridge arms of the bridge arm group in a common line; and one end of the fifth switch is connected to the negative electrode side of the first power battery, and the other end of the fifth switch, all lower bridge arms of the bridge arm group, and the second end of the charge/discharge switching module are connected in a common line, the positive electrode side of the second power battery is further connected to the first end of the charge/discharge switching module, the control module is connected to the switch module and the voltage regulation switch assembly and is used for controlling the voltage regulation switch assembly and the switch module to regulate the charge/discharge voltage between the external charge/discharge device and the power module, the external charge/discharge device is connected to the charge/discharge interface in the electrical device.

11. A power battery voltage regulation method, which is applicable to the power battery voltage regulation system of claim 10, comprising:

acquiring a first voltage of a power module and acquiring a second voltage of an external charge/discharge device; and controlling, according to the first voltage and the second voltage, the voltage regulation switch assembly and the switch module to regulate a charge/discharge voltage between the external charge/discharge device and the power module, wherein the first voltage is a battery voltage of the power module and the second voltage is an output voltage of the external charge/discharge device; or the first voltage is an output voltage of the power module and the second voltage is a requested voltage of the external charge/discharge device as a load, wherein controlling, according to the first voltage and the second voltage, the voltage regulation switch assembly and the switch module to regulate a charge/discharge voltage between the external charge/discharge device and the power module further comprises:

controlling, when the battery voltage is greater than the output voltage, the voltage regulation switch assembly and the switch module to boost a charge voltage of the external charge/discharge device for charging the power module; and controlling, when the battery voltage is less than the output voltage, the voltage regulation switch assembly and the switch module to buck the charge voltage of the external charge/discharge device for charging the power module.

12. The power battery voltage regulation method according to claim 11, wherein controlling the voltage regulation switch assembly and the switch module to boost a charge voltage of the external charge/discharge device for charging the power module specifically comprises:

controlling, in a first time period, the external charge/discharge device to charge the energy storage element; and controlling, in a second time period, the external charge/discharge device and the energy storage element together to charge the power battery.

13. The power battery voltage regulation method according to claim 11, wherein the switch module comprises a charge/discharge switching module and a bridge arm group connected in parallel; and the voltage regulation switch assembly comprises a first switch, a second switch, a third switch, a fourth switch, and a fifth switch; and controlling the voltage regulation switch assembly and the switch module to boost a charge voltage of the external charge/discharge device for charging the power module specifically comprises:

controlling, in a first time period, the first switch and the third switch to be on, a first switching circuit of the charge/discharge switching module and all lower bridge arms of the bridge arm group to be on, a second switching circuit of the charge/discharge switching module and all upper bridge arms of the bridge arm group to be off, and the second switch, the fourth switch, and the fifth switch to be off; and controlling, in a second time period, the first switch, the second switch, the third switch, and the fourth switch to be on, the first switching circuit of the charge/discharge switching module and all the upper bridge arms of the bridge arm group to be on, and the second switching circuit of the charge/discharge switching module, all the lower bridge arms of the bridge arm group, and the fifth switch to be off, wherein the control of the first time period and the control of the second time period are continuously performed alternatively.

14. The power battery voltage regulation method according to claim 11, wherein said controlling, when the battery voltage is less than the output voltage, the voltage regulation switch assembly and the switch module to buck the charge voltage of the external charge/discharge device for charging the power module specifically comprises:

controlling, in a first time period, the external charge/discharge device to charge the energy storage element; and controlling, in a second time period, the energy storage element to charge the power battery.

15. The power battery voltage regulation method according to claim 11, wherein the switch module comprises a charge/discharge switching module and a bridge arm group connected in parallel; and the voltage regulation switch assembly comprises a first switch, a second switch, a third switch, a fourth switch, and a fifth switch; and controlling the voltage regulation switch assembly and the switch module to buck a charge voltage of the external charge/discharge device for charging the power module specifically comprises:

controlling, in a first time period, the first switch and the third switch to be on, a first switching circuit of the charge/discharge switching module and all lower bridge arms of the bridge arm group to be on, a second switching circuit of the charge/discharge switching module and all upper bridge arms of the bridge arm group to be off, and the second switch, the fourth switch, and the fifth switch to be off; and controlling, in a second time period, the second switch and the fourth switch to be on, the fifth switch to be off, the second switching circuit of the charge/discharge switching module and all upper bridge arms of the bridge arm group to be on, the first switching circuit of the charge/discharge switching module, all lower bridge arms of the bridge arm group, the first switch, the third switch, and the fifth switch to be off, wherein the control of the first time period and the control of the second time period are continuously performed alternatively.

16. The power battery voltage regulation method according to claim 11, wherein said controlling, according to the first voltage and the second voltage, the voltage regulation switch assembly and the switch module to regulate a charge/discharge voltage between the external charge/discharge device and the power module specifically comprises:

controlling, when the output voltage of the power module is less than the requested voltage, the voltage regulation switch assembly and the switch module to boost a charge voltage of the power module for charging the external charge/discharge device; and controlling, when the output voltage of the power module is greater than the requested voltage, the voltage regulation switch assembly and the switch module to buck the charge voltage of the power module for charging the external charge/discharge device.

17. The power battery voltage regulation method according to claim 16, wherein controlling the voltage regulation switch assembly and the switch module to boost a charge voltage of the power module for charging the external charge/discharge device specifically comprises:

controlling, in a first time period, the power battery to charge the energy storage element; and controlling, in a second time period, the power battery and the energy storage element together to charge the external charge/discharge device.

18. The power battery voltage regulation method according to claim 16, wherein the switch module comprises a charge/discharge switching module and a bridge arm group connected in parallel; and the voltage regulation switch assembly comprises a first switch, a second switch, a third switch, a fourth switch, and a fifth switch; and said controlling the voltage regulation switch assembly and the switch module to boost a charge voltage of the power module for charging the external charge/discharge device specifically comprises:

controlling, in a first time period, the second switch and the fourth switch to be on, the fifth switch to be off, a second switching circuit of the charge/discharge switching module and all upper bridge arms of the bridge arm group to be on, a first switching circuit of the charge/discharge switching module, all lower bridge arms of the bridge arm group, the first switch, the third switch, and the fifth switch to be off; and controlling, in a second time period, the first switch, the second switch, the third switch, and the fourth switch to be on, the first switching circuit of the charge/discharge switching module and all the upper bridge arms of the bridge arm group to be on, and the second switching circuit of the charge/discharge switching module, all the lower bridge arms of the bridge arm group, and the fifth switch to be off, wherein the control of the first time period and the control of the second time period are continuously performed alternatively.

19. The power battery voltage regulation method according to claim 16, wherein controlling the voltage regulation switch assembly and the switch module to buck a charge voltage of the power module for charging the external charge/discharge device specifically comprises:

controlling, in a first time period, the power battery to charge the energy storage element; and controlling, in a second time period, the energy storage element to charge the external charge/discharge device.

20. The power battery voltage regulation method according to claim 16, wherein the switch module comprises a charge/discharge switching module and a bridge arm group connected in parallel; and the voltage regulation switch assembly comprises a first switch, a second switch, a third switch, a fourth switch, and a fifth switch; and said controlling the voltage regulation switch assembly and the switch module to buck a charge voltage of the power module for charging the external charge/discharge device specifically comprises:

controlling, in a first time period, the second switch and the fourth switch to be on, the fifth switch to be off, a second switching circuit of the charge/discharge switching module and all upper bridge arms of the bridge arm group to be on, a first switching circuit of the charge/discharge switching module, all lower bridge arms of the bridge arm group, the first switch, the third switch, and the fifth switch to be off; and controlling, in a second time period, the first switch and the third switch, the first switching circuit of the charge/discharge switching module and all lower bridge arms of the bridge arm group to be on, the second switching circuit of the charge/discharge switching module and all upper bridge arms of the bridge arm group, and the third switch, the fourth switch, and the fifth switch to be off, wherein the control of the first time period and the control of the second time period are continuously performed alternatively.

* * * * *